(12) United States Patent
Makigaki

(10) Patent No.: US 9,025,076 B2
(45) Date of Patent: May 5, 2015

(54) EXCHANGEABLE LENS AND CAMERA SYSTEM

(75) Inventor: Taro Makigaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 270 days.

(21) Appl. No.: 13/589,544

(22) Filed: Aug. 20, 2012

(65) Prior Publication Data

US 2013/0044239 A1    Feb. 21, 2013

(30) Foreign Application Priority Data

Aug. 18, 2011  (JP) .................................. 2011-178967
Aug. 18, 2011  (JP) .................................. 2011-178968

(51) Int. Cl.
*H04N 5/225* (2006.01)
*G03B 17/14* (2006.01)

(52) U.S. Cl.
CPC ................ *G03B 17/14* (2013.01); *H04N 5/225* (2013.01); *G03B 2206/00* (2013.01)

(58) Field of Classification Search
CPC ............................ G03B 17/14; G03B 2206/00
USPC .............. 348/360, 240.99, 240.1, 240.3, 349
See application file for complete search history.

(56) References Cited

U.S. PATENT DOCUMENTS

2008/0088945 A1*  4/2008  Satori ........................... 359/690
2010/0059844 A1*  3/2010  Tanaka ........................ 257/432
2011/0109978 A1*  5/2011  Yamada et al. ............... 359/684

FOREIGN PATENT DOCUMENTS

| JP | A-2-123879 | 5/1990 |
| JP | A-2007-317951 | 12/2007 |
| JP | A-2010-39759 | 2/2010 |
| JP | A-2010-41682 | 2/2010 |
| JP | A-2011-124916 | 6/2011 |

\* cited by examiner

*Primary Examiner* — Mekonnen Dagnew
(74) *Attorney, Agent, or Firm* — Oliff PLC

(57) ABSTRACT

An exchangeable lens detachably mounted at a camera body includes: an optical characteristics storage unit; an optical characteristics information generation unit; and an optical characteristics transmission unit. Peripheral shading information for only some image heights is stored as the information pertaining to the peripheral shading characteristics of the exchangeable lens into the optical characteristics storage unit, but peripheral shading information for at least one image height position among five image height positions equivalent to integral multiples of y1, which represents an image height equal to ⅙ of an image height measured from a center of a substantially rectangular image capturing range to one of four corners of the image capturing range, obtained by multiplying y1 by integers in a range 2 through 6, is not stored in the optical characteristics storage unit.

12 Claims, 14 Drawing Sheets

FIG.6

IMAGE HEIGHT :(2/6)Y    F 4.5

|  | \multicolumn{13}{c}{PHOTOGRAPHIC DISTANCE} |
| --- | --- | --- | --- | --- | --- | --- | --- | --- | --- | --- | --- | --- | --- | --- |
|  | | L1 | L2 | L3 | L4 | L5 | L6 | L7 | L8 | L9 | L10 | ... | ... | ... | Ln |
| FOCAL LENGTH | f1 | | | | | | | | | | | | | | |
| | f2 | | | | | | | | | | | | | | |
| | f3 | | | | | | | | | | | | | | |
| | f4 | | | | | | | | | | | | | | |
| | f5 | | | | | | | | | | | | | | |
| | f6 | | | | | | | | | | | | | | |
| | f7 | | | | | | | | | | | | | | |
| | f8 | | | | | | | | | | | | | | |
| | f9 | | | | | | | | | | | | | | |
| | f10 | | | | | | | | | | | | | | |
| | ⋮ | | | | | | | | | | | | | | |
| | ⋮ | | | | | | | | | | | | | | |
| | ⋮ | | | | | | | | | | | | | | |
| | fn | | | | | | | | | | | | | | |

IMAGE HEIGHT :(2/4)Y   Red

540

| FOCAL LENGTH | | PHOTOGRAPHIC DISTANCE | | | | | | | | | | | | | |
|---|---|---|---|---|---|---|---|---|---|---|---|---|---|---|---|
| | | L1 | L2 | L3 | L4 | L5 | L6 | L7 | L8 | L9 | L10 | ... | ... | ... | Ln |
| | f1 | | | | | | | | | | | | | | |
| | f2 | | | | | | | | | | | | | | |
| | f3 | | | | | | | | | | | | | | |
| | f4 | | | | | | | | | | | | | | |
| | f5 | | | | | | | | | | | | | | |
| | f6 | | | | | | | | | | | | | | |
| | f7 | | | | | | | | | | | | | | |
| | f8 | | | | | | | | | | | | | | |
| | f9 | | | | | | | | | | | | | | |
| | f10 | | | | | | | | | | | | | | |
| | ⋮ | | | | | | | | | | | | | | |
| | ⋮ | | | | | | | | | | | | | | |
| | ⋮ | | | | | | | | | | | | | | |
| | fn | | | | | | | | | | | | | | |

FIG.13

IMAGE HEIGHT :(2/4)Y    Red

540

| | | PHOTOGRAPHIC DISTANCE ||||||||||||| 
|---|---|---|---|---|---|---|---|---|---|---|---|---|---|
| | | L1 | L2 | L3 | L4 | L5 | L6 | L7 | L8 | L9 | L10 | ... ... ... | Ln |
| FOCAL LENGTH | f1 | | | | | | | | | | | | |
| | f2 | | | | | | | | | | | | |
| | f3 | | | | | | | | | | | | |
| | f4 | | | | | | | | | | | | |
| | f5 | | | | | | | | | | | | |
| | f6 | | | | | | | | | | | | |
| | f7 | | | | | | | | | | | | |
| | f8 | | | | | | | | | | | | |
| | f9 | | | | | | | | | | | | |
| | f10 | | | | | | | | | | | | |
| | : | | | | | | | | | | | | |
| | : | | | | | | | | | | | | |
| | : | | | | | | | | | | | | |
| | fn | | | | | | | | | | | | | though, for instance, image processing corresponding to the optical characteristics of the particular exchangeable lens. In order to execute the optimal image processing, the camera body must obtain information pertaining to the optical characteristics of the exchangeable lens. The camera body of an image processing apparatus disclosed in Japanese Laid Open Patent Publication No. 2010-41682 obtains optical characteristics information, originating from an exchangeable lens, which indicates the optical characteristics corresponding to the particular exchangeable lens type, or reads information pertaining to the optical characteristics of a specific exchangeable lens from its own memory where information related to the optical characteristics of a plurality of types of exchangeable lenses is stored in advance.

EXCHANGEABLE LENS AND CAMERA SYSTEM

The disclosures of the following priority applications are herein incorporated by reference:
Japanese Patent Application No. 2011-178967 tiled Aug. 18, 2011
Japanese Patent Application No. 2011-178968 filed Aug. 18, 2011

BACKGROUND OF THE INVENTION

1. Field of the Invention

The present invention relates to an exchangeable lens and a camera system.

2. Description of Related Art

Exchangeable lenses used in a camera system compatible with various types of exchangeable lenses manifest different optical characteristics such as peripheral shading (vignetting) characteristics. Accordingly, the quality of an image captured in the camera system needs to be improved through, for instance, image processing corresponding to the optical characteristics of the particular exchangeable lens. In order to execute the optimal image processing, the camera body must obtain information pertaining to the optical characteristics of the exchangeable lens. The camera body of an image processing apparatus disclosed in Japanese Laid Open Patent Publication No. 2010-41682 obtains optical characteristics information, originating from an exchangeable lens, which indicates the optical characteristics corresponding to the particular exchangeable lens type, or reads information pertaining to the optical characteristics of a specific exchangeable lens from its own memory where information related to the optical characteristics of a plurality of types of exchangeable lenses is stored in advance.

SUMMARY OF THE INVENTION

In the camera disclosed in the patent literature cited above, ten sets of peripheral shading characteristics data corresponding to ten different image heights, excluding the image height corresponding to the image plane center, for instance, are available. There are conflicting issues to be addressed with regard to the volume of optical characteristics data. Namely, while better accuracy of image processing and the like can be assured by providing a greater number of sets of optical characteristics data such as shading characteristics data, the camera will be required to have a large memory capacity to handle the data.

An exchangeable lens detachably mounted at a camera body according to a 1st aspect of the present invention, comprises: an optical characteristics storage unit in which optical characteristics information pertaining to optical characteristics of the exchangeable lens including, at least, information pertaining to peripheral shading characteristics of the exchangeable lens, is stored; an optical characteristics information generation unit that generates information pertaining to optical characteristics of the exchangeable lens to be transmitted to the camera body based upon the optical characteristics information stored in the optical characteristics storage unit; and an optical characteristics transmission unit that transmits the information pertaining to the optical characteristics of the exchangeable lens, having been generated by the optical characteristics information generation unit, to the camera body, wherein: peripheral shading information for only some image heights is stored as the information pertaining to the peripheral shading characteristics of the exchangeable lens into the optical characteristics storage unit, but peripheral shading information for at least one image height position among rive image height positions equivalent to integral multiples of y1, which represents an image height equal to ⅙ of an image height measured from a center of a substantially rectangular image capturing range to one of four centers of the image capturing range, obtained by multiplying y1 by integers in a range of 2 through 6, is not stored in the optical characteristics storage unit; the optical characteristics information generation unit generates the peripheral shading information for the five image height positions to be transmitted to the camera body based upon the information pertaining to the peripheral shading characteristics of the exchangeable lens stored in the optical characteristics storage unit; and the optical characteristics transmission unit transmits the peripheral shading information for the five image height positions generated by the optical characteristics information generation unit.

According to a 2nd aspect of the present invention in the exchangeable lens according to the 1st aspect, it is preferable that peripheral shading information for image height positions other than the at least one image height position among the five image height positions, is stored in the optical characteristics storage unit as the information pertaining to the peripheral shading characteristics of the exchangeable lens.

According to a 3rd aspect of the present invention, in the exchangeable lens according to the 1st or 2nd aspect, the optical characteristics information generation unit may generate the peripheral shading information for the at least one image height position by using peripheral shading information for an image height stored in the optical characteristics storage unit for a substitution.

According to a 4th aspect of the present invention, in the exchangeable lens according to the 1st or 2nd aspect, the optical characteristics information generation unit may generate the peripheral shading information for the at least one image height position through interpolation executed based upon the peripheral shading information for some image heights stored in the optical characteristics storage unit.

According to a 5th aspect of the present invention, in the exchangeable lens according to any one of the 1st through 4th aspects, it is preferable that peripheral shading information is stored in the optical characteristics storage unit in correspondence to individual values taken for an aperture value, a focal length and a photographing distance at the exchangeable lens; and the optical characteristics information generation unit generates the peripheral shading information for the five image height positions in correspondence to an aperture value, a focal length and a photographing distance currently assumed at the exchangeable lens.

According to a 6th aspect of the present invention, in the exchangeable lens according to the 5th aspect, it is preferable that the peripheral shading information is stored discretely in relation to various parameters including the aperture value, the focal length and the photographing distance at the exchangeable lens; and if the peripheral shading information corresponding to the aperture value, the focal length and the photographing distance currently assumed at the exchangeable lens is not stored in the optical characteristics storage unit, the optical characteristics information generation unit generates the peripheral shading information corresponding to the aperture value, the focal length and the photographic distance currently assumed at the exchangeable lens through interpolation executed based upon the peripheral shading information stored in the optical characteristics storage unit and the aperture value, the focal length and the photographic distance currently assumed at the exchangeable lens.

According to a 7th aspect, of the present invention, in the exchangeable lens according to any one of the 1st through 6th aspects, it is preferable to further comprise: an image forming optical system that includes a focusing lens; a lens position detection unit that detects a position of the focusing lens and outputs a lens position signal; and a lens position signal transmission unit that transmits the lens position signal output from the lens position detection unit to the camera body, wherein: the lens position signal transmission unit transmits the lens position signal output from the lens position detection unit to the camera body via a first transmission path; and the optical characteristics transmission unit transmits the optical characteristics information to the camera body via a second transmission path different from the first transmission path.

According to an 8th aspect of the present invention, in the exchangeable lens according to the 7th aspect, it is preferable to further comprise: a transmission control unit that controls the lens position signal transmission unit and the optical characteristics transmission unit; a shift detection unit that detects a shift in a signal level at a communication start signal line of the camera body; and an instruction data reception unit that receives specific data expressing various instructions transmitted from the camera body, wherein: as the shift detection unit detects a shift in the signal level at the communication start signal line, the transmission control unit controls the lens position signal transmission unit so as to transmit the lens position signal output from the lens position detection unit to the camera body via the first transmission path; and as the instruction data reception unit receives specific data expressing an instruction for peripheral shading information transmission, the transmission control unit controls the optical characteristics transmission unit so as to transmit the peripheral shading information to the camera body via the second transmission path.

According to a 9th aspect of the present invention, in the exchangeable lens according to the 8th aspect, the instruction data reception unit may receive the various instructions over image output cycles with which an image sensor disposed at the camera body outputs images; and the transmission control unit may execute control so as to transmit the peripheral shading information to the camera body over cycles corresponding to the image output cycles.

A camera system, according to a 10th aspect of the present invention, that includes a camera body and an exchangeable lens detachably mounted at the camera body, wherein: the exchangeable lens comprises: an optical characteristics storage unit in which optical characteristics information pertaining to optical characteristics of the exchangeable lens including, at least, information pertaining to peripheral shading characteristics of the exchangeable lens, is stored; an optical characteristics information generation unit that generates information pertaining to optical characteristics of the exchangeable lens to be transmitted to the camera body based upon the optical characteristics information stored in the optical characteristics storage unit; and an optical characteristics transmission unit that transmits the information pertaining to the optical characteristics of the exchangeable lens, having been generated by the optical characteristics information generation unit, to the camera body; peripheral shading information for only some image heights is stored as the information pertaining to the peripheral shading characteristics of the exchangeable lens into the optical characteristics storage unit, but peripheral shading information for at least one image height position among five image height positions equivalent to integral multiples of y1, which represents an image height equal to ⅙ of an image height measured from a center of a substantially rectangular image capturing range to one of four corners of the image capturing range, obtained by multiplying y1 by integers in a range of 2 through 6, is not stored in the optical characteristics storage unit; the optical characteristics information generation unit generates the peripheral shading information for the five image height positions to be transmitted to the camera body based upon the information pertaining to the peripheral shading characteristics of the exchangeable lens stored in the optical characteristics storage unit; the optical characteristics transmission unit transmits the peripheral shading information for the five image height positions generated by the optical characteristics information generation unit; the camera body comprises: an exposure calculation unit that executes exposure calculation so as to achieve optimal exposure in correspondence to subject brightness; an image processing unit that executes image processing for image data obtained through image capturing operation; and an optical characteristics information reception unit that receives, at least, the peripheral shading information for the five image height positions among various types of information pertaining to the optical characteristics of the exchangeable lens, from the optical characteristics transmission unit; the exposure calculation unit executes the exposure calculation so as to achieve the optimal exposure corresponding to the subject brightness by referencing peripheral shading information for image height positions measured from the center of the image capturing range equivalent to even-number multiples of y1 obtained by multiplying y1 by even numbers in the range of 2 through 6 among sets of peripheral shading information corresponding to the five image height positions received at the optical characteristics information reception unit; and the image processing unit executes the image processing on the image data by referencing the peripheral shading information for the five image height positions received at the optical characteristics information reception unit.

According to an 11th aspect of the present invention, in the camera system according to the 10th aspect, it is preferable that the exchangeable lens further comprises: an image forming optical system that includes a focusing lens; a lens position detection unit that detects a position of the focusing lens and outputs a lens position signal; and a lens position signal transmission unit that transmits the lens position signal output from the lens position detection unit to the camera body; the lens position signal transmission unit transmits the lens position signal output from the lens position detection unit to the camera body via a first lens-side transmission path; the optical characteristics transmission unit transmits the optical characteristics information to the camera body via a second lens-side transmission path different from the first lens-side transmission path; the camera body further comprises: a lens position signal reception unit that receives the lens position signal output from the lens position signal transmission unit; the lens position signal reception unit receives the lens position signal output from the lens position signal transmission unit via a first body-side transmission path; and the optical characteristics information reception unit receives the optical characteristics information via a second body-side transmission path different from the first body-side transmission path.

An exchangeable lens detachably mounted at a camera body, according to a 12th aspect of the present invention, comprises: an optical characteristics storage unit in which peripheral shading information constituting a minimum component of information pertaining to optical characteristics of the exchangeable lens, to be transmitted to the camera body and indicating peripheral shading characteristics manifesting at, at least, some of image height positions defined by dividing an image height measured from a center of an image capturing range to one of four corners of the image capturing range into a predetermined number of blocks, is stored; an optical characteristics information generation unit that generates peripheral shading information to be transmitted to the camera body based upon the peripheral shading information stored in the optical characteristics storage unit; and an optical characteristics transmission unit that transmits the peripheral shading information generated by the optical characteristics generation unit to the camera body.

A camera system, according to a 13th aspect of the present invention, that includes a camera body and an exchangeable lens detachably mounted at the camera body, wherein: the exchangeable lens comprises: an optical characteristics storage unit in which optical characteristics information pertaining to optical characteristics of the exchangeable lens including, at least, information pertaining to peripheral shading characteristics of the exchangeable lens, is stored; an optical characteristics information generation unit that generates information pertaining to optical characteristics of the exchangeable lens to be transmitted to the camera body based upon the optical characteristics information stored in the optical characteristics storage unit; and an optical characteristics transmission unit that transmits the information pertaining to the optical characteristics of the exchangeable lens having been generated by the optical characteristics information generation unit to the camera body; peripheral shading information for only some image heights is stored as the information pertaining to the peripheral shading characteristics of the exchangeable lens into the optical characteristics storage unit, but peripheral shading information for at least one image height position among (N−1) image height positions (N is any integer equal to or greater than 3) equivalent to integral multiples of y1, which represents an image height equal to 1/N of an image height measured from a center of a substantially rectangular image capturing range to one of four corners of the image capturing range, obtained by multiplying y1 by integers in a range of 2 through N, is not stored in the optical characteristics storage unit; the optical characteristics information generation unit generates the peripheral shading information for the (N−1) image height positions to be transmitted to the camera body based upon the information pertaining to the peripheral shading characteristics of the exchangeable lens stored in the optical characteristics storage unit; the optical characteristics transmission unit transmits the peripheral shading information for the (N−1) image height positions generated by the optical characteristics information generation unit; the camera body comprises: an exposure calculation unit that executes exposure calculation so as to achieve optimal exposure in correspondence to subject brightness; an image processing unit that executes the image processing for image data obtained through image capturing operation; and an optical characteristics information reception unit that receives, at least, the peripheral shading information for the (N−1) image height positions among various types of information indicating the optical characteristics of the exchangeable lens, from the optical characteristics transmission unit; the exposure calculation unit executes the exposure calculation so as to achieve the optimal exposure corresponding to the subject brightness by referencing peripheral shading information for image height positions measured from the center of the image capturing range equivalent to even-number multiples of y1 obtained by multiplying y1 by even numbers in the range of 2 through N among sets of peripheral shading information corresponding to the (N−1) image height positions received at the optical characteristics information reception unit; and the image processing unit executes the image processing on the image data by referencing the peripheral shading information for the (N−1) image height positions received at the optical characteristics information reception unit.

An exchangeable lens detachably mounted at a camera body, according to a 14th aspect of the present invention, comprises: an optical characteristics storage unit in which optical characteristics information pertaining to optical characteristics of the exchangeable lens including, at least, information pertaining to peripheral shading characteristics of the exchangeable lens, is stored; an optical characteristics information generation unit that generates information pertaining to optical characteristics of the exchangeable lens to be transmitted to the camera body based upon the optical characteristics information stored in the optical characteristics storage unit; and an optical characteristics transmission unit that transmits information pertaining to the optical characteristics of the exchangeable lens, having been generated by the optical characteristics information generation unit, to the camera body, wherein: a calculation expression to be used to generate through calculation peripheral shading information by using an image height as a parameter, is stored in the optical characteristics storage unit as the information pertaining to the peripheral shading characteristics of the exchangeable lens; the optical characteristics information generation unit generates, based upon the calculation expression stored in the optical characteristics storage unit, peripheral shading information for five image height positions measured from a center of a substantially rectangular image capturing range, equivalent to integral multiples of y1, which represents an image height equal to ⅙ of an image height ranging from the center of the image capturing range to one of four corners of the image capturing range, obtained by multiplying y1 by integers in a range 2 through 6; and the optical characteristics transmission unit transmits the peripheral shading information for the five image height positions generated by the optical characteristics information generation unit.

According to a 15th aspect of the present invention, in the exchangeable lens according to the 14th aspect, it is preferable that values taken for a coefficient in the calculation expression are stored in the optical characteristics storage unit in correspondence to values assumed for an aperture value, a focal length and a photographing distance at the exchangeable lens; and the optical characteristics information generation unit generates the peripheral shading information for the five image height positions based upon the calculation expression by referencing the coefficient stored in the optical characteristics storage unit in correspondence to an aperture number, a focal length and a photographic distance currently assumed at the exchangeable lens.

According to a 16th aspect of the present invention, in the exchangeable lens according to the 14th or 15th aspect, it is preferable to further comprise: an image forming optical system that includes a focusing lens; a lens position detection unit that detects a position of the focusing lens and outputs a lens position signal; and a lens position signal transmission unit that transmits the lens position signal output from the lens position detection unit to the camera body, wherein: the lens position signal transmission unit transmit the lens position signal output from the lens position detection unit to the camera body via a first transmission path; and the optical characteristics transmission unit transmits the optical characteristics information to the camera body via a second transmission path different from the first transmission path.

According to a 17th aspect of the present invention, in the exchangeable lens according to the 16th aspect, it is preferable to further comprise: a transmission control unit that controls the lens position signal transmission unit and the optical characteristics transmission unit; a shift detection unit that detects a shift in a signal level at a communication start signal line of the camera body; and an instruction data reception unit that receives specific data expressing various instructions transmitted from the camera body, wherein: as the shift detection unit detects a shift in the signal level at the communication start signal line, the transmission control unit controls the lens position signal transmission unit so as to transmit the lens position signal output from the lens position detection unit to the camera body via the first transmission path; and as the instruction data reception unit receives specific data expressing an instruction for peripheral shading information transmission, the transmission control unit controls the optical characteristics transmission unit so as to transmit the peripheral shading information to the camera body via the second transmission path.

According to an 18th aspect of the present invention, in the exchangeable lens according to the 17th aspect, it is preferable that the instruction data reception unit receives the various instructions over image output cycles with which an image sensor disposed at the camera body outputs images; and the transmission control unit executes control so as to transmit the peripheral shading information to the camera body over cycles corresponding to the image output cycles.

A camera system, according to a 19th aspect of the present invention, that includes a camera body and an exchangeable lens detachably mounted at the camera body, wherein: the exchangeable lens comprises: an optical characteristics storage unit in which optical characteristics information pertaining to optical characteristics of the exchangeable lens including, at least, information pertaining to peripheral shading characteristics of the exchangeable lens, is stored; an optical characteristics information generation unit that generates information pertaining to optical characteristics of the exchangeable lens to be transmitted to the camera body based upon the optical characteristics information stored in the optical characteristics storage unit; and an optical characteristics transmission unit that transmits the information pertaining to the optical characteristics of the exchangeable lens, having been generated by the optical characteristics information generation unit, to the camera body; a calculation expression to be used to generate through calculation peripheral shading information by using an image height as a parameter, is stored in the optical characteristics storage unit as the information pertaining to the peripheral shading characteristics of the exchangeable lens; and the optical characteristics information generation unit generates, based upon the calculation expression stored in the optical characteristics storage unit, peripheral shading information for five image height positions, measured from a center of a substantially rectangular image capturing range, equivalent to integral multiples of $y1$, which represents an image height equal to ⅙ of an image height ranging from the center of the image capturing range to one of four corners of the image capturing range, obtained by multiplying $y1$ by integers in a range 2 through 6; the optical characteristics transmission unit transmits the peripheral shading information for the five image height positions generated by the optical characteristics information generation unit; the camera body comprises: an exposure calculation unit that executes exposure calculation so as to achieve optimal exposure in correspondence to subject brightness; an image processing unit that executes the image processing for image data obtained through image capturing operation; and an optical characteristics information reception unit that receives, at least, the peripheral shading information for the five image height positions among various types of information pertaining to the optical characteristics of the exchangeable lens, from the optical characteristics transmission unit; the exposure calculation unit executes the exposure calculation so as to achieve the optimal exposure corresponding to the subject brightness by referencing peripheral shading information for image height positions measured from the center of the image capturing range equivalent to even-number multiples of $y1$ obtained by multiplying $y1$ by even numbers in the range of 2 through 6 among sets of peripheral shading information corresponding to the five image height positions received at the optical characteristics information reception unit; and the image processing unit executes the image processing on the image data by referencing the peripheral shading information for the five image height positions received at the optical characteristics information reception unit.

According to a 20th aspect of the present invention, in the camera system according to the 19th aspect, it is preferable that the exchangeable lens further comprises: an image forming optical system that includes a focusing lens; a lens position detection unit that detects a position of the focusing lens and outputs a lens position signal; and a lens position signal transmission unit that transmits the lens position signal output from the lens position detection unit to the camera body; the lens position signal transmission unit transmits the lens position signal output from the lens position detection unit to the camera body via a first lens-side transmission path; the optical characteristics transmission unit transmits the optical characteristics information to the camera body via a second lens-side transmission path different from the first lens-side transmission path; the camera body further comprises: a lens position signal reception unit that receives the lens position signal output from the lens position signal transmission unit; the lens position signal reception unit receives the lens position signal output from the lens position signal transmission unit via a first body-side transmission path; and the optical characteristics information reception unit receives the optical characteristics information via a second body-side transmission path different from the first body-side transmission path.

An exchangeable lens detachably mounted at a camera body, according to a 21st aspect of the present invention, comprises: an optical characteristics storage unit in which optical characteristics information pertaining to optical characteristics of the exchangeable lens including, at least, information pertaining to peripheral shading characteristics of the exchangeable lens, is stored; an optical characteristics information generation unit that generates information pertaining to optical characteristics of the exchangeable lens to be transmitted to the camera body based upon the optical characteristics information stored in the optical characteristics storage unit; and an optical characteristics transmission unit that transmits the information pertaining to the optical characteristics of the exchangeable lens, having been generated by the optical characteristics information generation unit, to the camera body, wherein: a calculation expression to be used to generate through calculation peripheral shading information by using an image height as a parameter, is stored in the optical characteristics storage unit as the information pertaining to the peripheral shading characteristics of the exchangeable lens; the optical characteristics information generation unit generates, based upon the calculation expression stored in the optical characteristics storage unit, peripheral shading information for (N−1) image height positions (N is an integer equal to or greater than 2) measured from a center of a substantially rectangular image capturing range, equivalent to integral multiples of $y1$, which represents an image height equal to 1/N of an image height ranging from the center of the image capturing range to one of four corners of the image capturing range, obtained by multiplying y1 by integers in a range of 2 through N; and the optical characteristics transmission unit transmits the peripheral shading information for the (N−1) image height positions generated by the optical characteristics information generation unit.

A camera system, according to a 22nd aspect of the present invention, that includes a camera body and an exchangeable lens detachably mounted at the camera body, wherein: the exchangeable lens comprises: an optical characteristics storage unit in which optical characteristics information pertaining to optical characteristics of the exchangeable lens including, at least, information pertaining to peripheral shading characteristics of the exchangeable lens, is stored; an optical characteristics information generation unit that generates information pertaining to optical characteristics of the exchangeable lens to be transmitted to the camera body based upon the optical characteristics information stored in the optical characteristics storage unit; and an optical characteristics transmission unit that transmits the information pertaining to the optical characteristics of the exchangeable lens, having been generated by the optical characteristics information generation unit, to the camera body; a calculation expression to be used to generate through calculation peripheral shading information by using an image height as a parameter, is stored in the optical characteristics storage unit as the information pertaining to the peripheral shading characteristics of the exchangeable lens; the optical characteristics information generation unit generates, based upon the calculation expression stored in the optical characteristics storage unit, peripheral shading information for (N−1) image height positions (N is an integer equal to or greater than 2) measured from a center of a substantially rectangular image capturing range, equivalent to integral multiples of y1, which represents an image height equal to 1/N of an image height ranging from the center of the image capturing range to one of four corners of the image capturing range, obtained by multiplying y1 by integers in a range 2 through 6; the optical characteristics transmission unit transmits the peripheral shading information for the (N−1) image height positions generated by the optical characteristics information generation unit; the camera body comprises: an exposure calculation unit that executes exposure calculation so as to achieve optimal exposure in correspondence to subject brightness; an image processing unit that executes the image processing for image data obtained through image capturing operation; and an optical characteristics information reception unit that receives, at least, the peripheral shading information for the (N−1) image height positions among various types of information pertaining to the optical characteristics of the exchangeable lens, from the optical characteristics transmission unit, the exposure calculation unit executes the exposure calculation so as to achieve the optimal exposure corresponding to the subject brightness by referencing peripheral shading information for image height positions measured from the center of the image capturing range equivalent to even-number multiples of y1 obtained by multiplying y1 by even numbers in the range of 2 through N among sets of peripheral shading information corresponding to the (N−1) image height positions received at the optical characteristics information reception unit; and the image processing unit executes the image processing on the image data by referencing the peripheral shading information for the (N−1) image height positions received at the optical characteristics information reception unit.

BRIEF DESCRIPTION OF THE DRAWINGS

FIG. 6 shows information pertaining to peripheral shading characteristics stored in the ROM in the exchangeable lens.

FIG. 8 shows information pertaining to magnification factor chromatic aberration stored in the ROM in the exchangeable lens.

FIG. 13 shows information pertaining to magnification factor chromatic aberration stored in the ROM in the exchangeable lens.

DESCRIPTION OF PREFERRED EMBODIMENTS

First Embodiment

Figure 1:
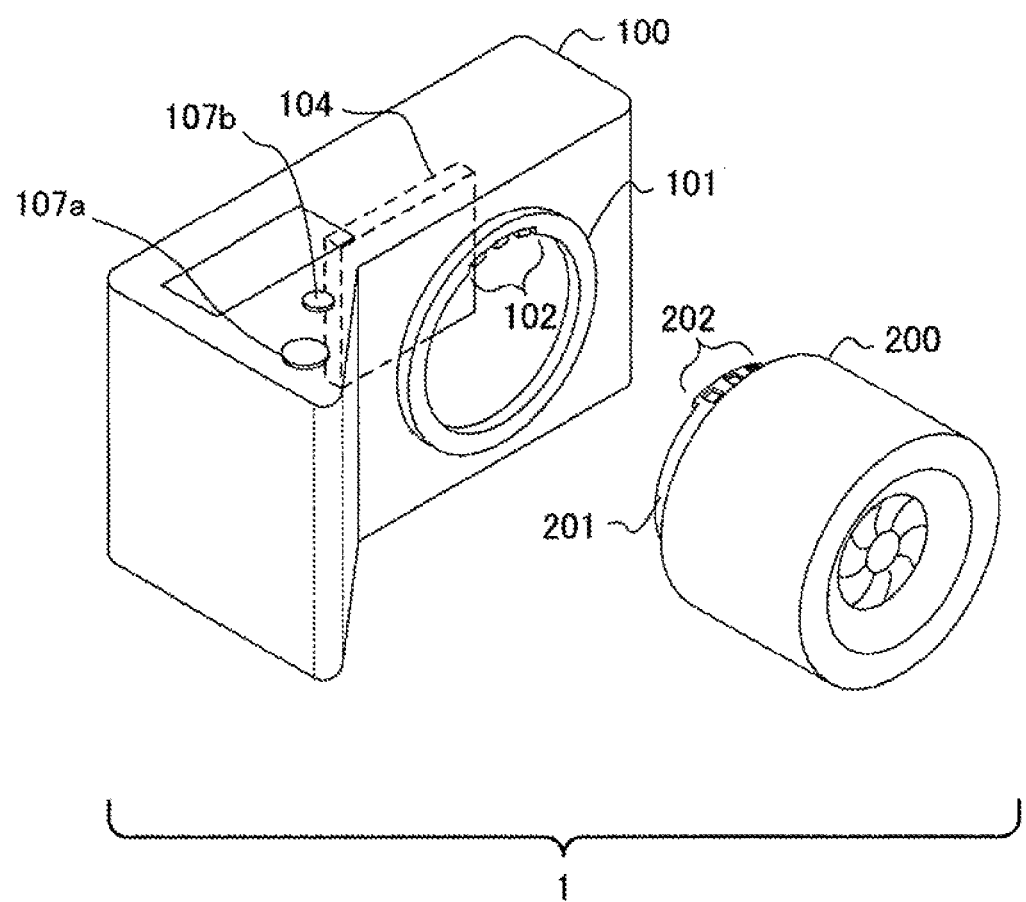
FIG. 1 is a perspective showing a camera system compatible with exchangeable lenses achieved in a first embodiment of the present invention.

In reference to FIGS. 1 through 9, an exchangeable lens and a camera system achieved in the first embodiment of the present invention will be described. FIG. 1 is a perspective of the camera system compatible with exchangeable lenses achieved in the embodiment. It is to be noted that FIG. 1 specifically illustrates the devices and units relevant to the present invention and that no illustration or explanation of devices and units not directly relevant to the present invention is provided. The camera system 1 includes a camera body 100 and a lens barrel 200, which is an exchangeable lens detachably mounted at the camera body 100. The lens barrel 200 is an optical member widely known as a zoom lens, the focal length of which can be altered by operating a zoom ring (not shown).

A lens mount 101 at which the lens barrel 200 can be mounted is located at the camera body 100. In addition, a lens mount 201, via which the lens barrel 200 is detachably mounted at the body side lens mount 101, is located at the lens barrel 200. As the lens barrel 200 is engaged with the camera body 100, a connector portion 102 made up with a plurality of contact points disposed on the lens mount 101 at the camera body 100 becomes connected with a connector portion 202 made up with a plurality of contact points disposed on the lens mount 201 at the lens barrel 200. Via the connector portions 102 and 202, power is supplied from the camera body 100 to the lens barrel 200 and various signals are exchanged between the camera body 100 and the lens barrel 200.

An image sensor 104 is disposed further rearward relative to the lens mount 101 within the camera body 100. Buttons 107a and 107b, each used as an input device, are disposed on the top side of the camera body 100. The user is able to issue a photographing instruction, a photographing condition setting instruction and the like to the camera body 100 through these buttons 107a and 107b.

Figure 2:
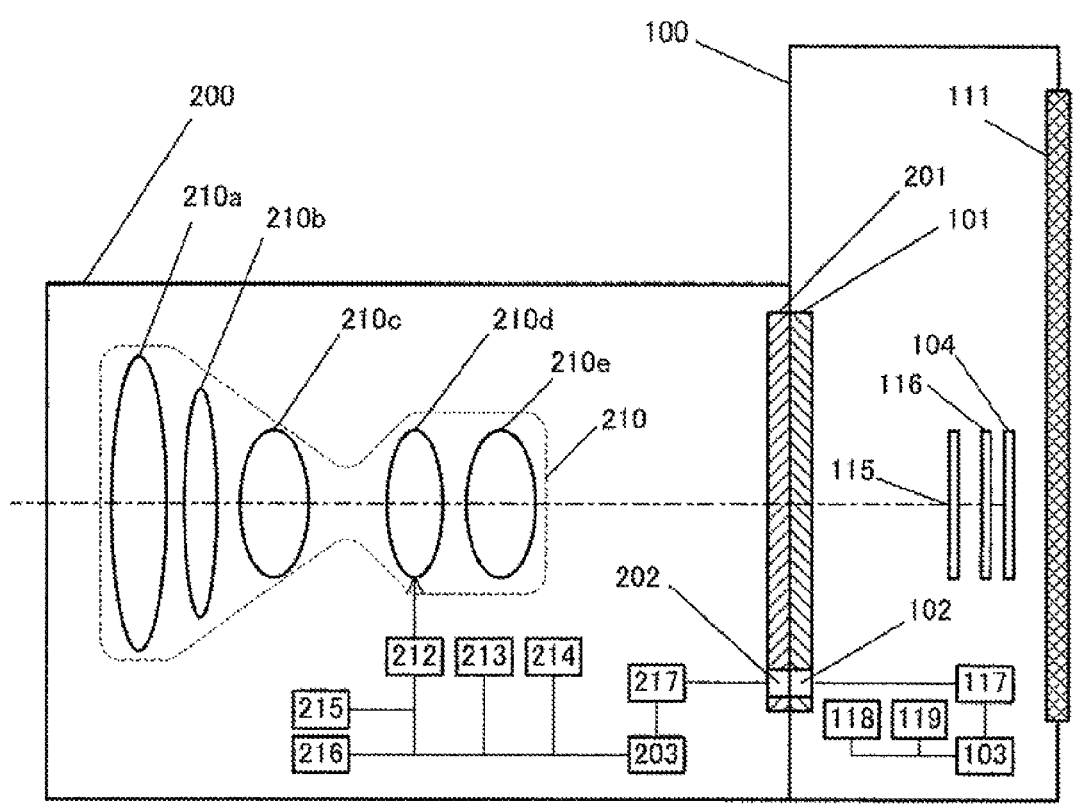
FIG. 2 shows the camera system compatible with exchangeable lenses achieved in the embodiment in a sectional view.

FIG. 2 is a sectional view of the camera system 1 compatible with exchangeable lenses achieved in the embodiment. The lens barrel 200 includes an image forming optical system 210 via which a subject image is formed. The image forming optical system 210 is configured with a plurality of lenses 210a through 210e. The plurality of lenses 210a through 210e include a focusing lens 210d used to control the focusing position for the subject image. The image forming optical system 210 is configured so that the focal length can be altered via a zoom ring (not shown).

A lens-side control unit 203 that controls various units in the lens barrel 200 is disposed inside the lens barrel 200. The lens-side control unit 203 is configured with a microcomputer, its peripheral circuits and the like (none shown). A lens-side transmission/reception unit 217, a lens drive unit 212, a lens position detection unit 213, a focal length detection unit 214, a ROM 215 and a RAM 216 are connected to the lens-side control unit 203.

The lens-side transmission/reception unit 217 is capable of exchanging signals with the camera body 100 via the connector portions 102 and 202. The lens drive unit 212, which includes an actuator such as a stepping motor, drives the focusing lens 210d over a range to be described in detail later in response to a signal input to the lens drive unit 212. The lens position detection unit 213 detects the position of the focusing lens 210d by, for instance, counting the number of signal pulses input to the stepping motor in the lens drive unit 212 and outputs a lens position signal. As an alternative, the position of the focusing lens 210d may be detected via a distance encoder or the like of the known art disposed at the lens barrel 200. The focal length detection unit 214 detects the focal length of the image forming optical system 210 via, for instance, a zoom encoder, and outputs a focal length signal.

In the ROM 215, which is a nonvolatile storage medium, a specific control program to be executed by the lens-side control unit 203, position information tables and a peripheral shading information table to be described later, and the like are stored in advance. The RAM 216, which is a volatile storage medium, is utilized as a storage area for various types of data by the lens-side control unit 203.

A shutter 115 and a filter 116 are disposed to the front of the image sensor 104. Subject light transmitted through the image forming optical system 210 enters the image sensor 104 via the shutter 115 and the filter 116. The exposure conditions at the image sensor 104 are controlled via the shutter 115. The filter 116 is an optical filter configured by combining an optical low pass filter and an infrared cutoff filter.

A body-side control unit 103 that controls the various units located at the camera body 100 is disposed inside the camera body 100. The body-side control unit 103 is configured with a microcomputer, its peripheral circuits and the like (none shown). A body-side transmission/reception unit 117, a ROM 118 and a RAM 119 are connected to the body-side control unit 103. The body-side transmission/reception unit 117 is connected to the connector portion 102 and is able to exchange signals with the lens-side transmission/reception unit 217.

In the ROM 118, which is a nonvolatile storage medium, a specific control program to be executed by the body-side control unit 103 and the like are stored in advance. The RAM 119, which is a volatile storage medium, is utilized as a storage area for various types of data by the body-side control unit 103.

On the rear surface of the camera body 100, a display device 111, constituted with an LCD panel and the like, is disposed. The body-side control unit 103 brings up on display at the display device 111 a subject image (often referred to as a live view image) based upon an output from the image sensor 104 and various menu screens, in which the photographing conditions and the like can be selected.

(Description of Automatic Focus Adjustment)

The body-side control unit 103 is configured so as to be able to execute automatic focus adjustment processing of the known art. The automatic focus adjustment processing includes focus detection processing through which the current focusing condition is detected and focus adjustment processing through which the focusing condition is adjusted by driving the focusing lens based upon the detection results. The body-side control unit 103 is capable of executing either of two different types of focus detection processing during the automatic focus adjustment processing. More specifically, the body-side control unit 103 is capable of executing focus detection processing through an imaging plane phase difference detection method and executing focus detection processing through a contrast detection method. The body-side control unit 103 executes the focus detection processing through one of these two detection methods, whichever is better suited for the current photographing conditions, subject characteristics or the like.

The focus detection processing executed by the body-side control unit 103 by adopting the imaging plane phase difference detection method will be described next. The image sensor 104 in the embodiment includes pixels specifically used for focus detection (hereafter to be referred to as focus detection pixels). The focus detection pixels are similar to those disclosed in Japanese Laid Open Patent Publication No. 2007-317951. The body-side control unit 103 executes the focus detection processing by using a phase difference detection operation of the known art with pixel output data provided from the focus detection pixels. It is to be noted that since this phase difference detection operation is executed in much the same way as, for instance, the phase difference detection operation described in Japanese Laid Open Patent Publication No. 2007-317951, a further explanation is not provided. The body-side control unit 103 executes automatic focus adjustment by driving the focusing lens 210d based upon a defocus quantity calculated through the focus detection processing.

Next, the focus detection processing executed by the body-side control unit 103 through the contrast detection method will be explained. The body-side control unit 103 calculates a focus evaluation value (contrast value) by executing a contrast detection operation of the known art through, so-called "hill-climbing method" in conjunction with pixel output data provided from image capturing pixels in the image sensor 104. The body-side control unit 103 executes the automatic focus adjustment by executing the contrast detection operation while driving the focusing lens 210d over a specific range to be described in detail later and detecting the position assumed by the focusing lens 210d at which the focus evaluation value peaks.

(Description of Data Communication)

Figure 3:
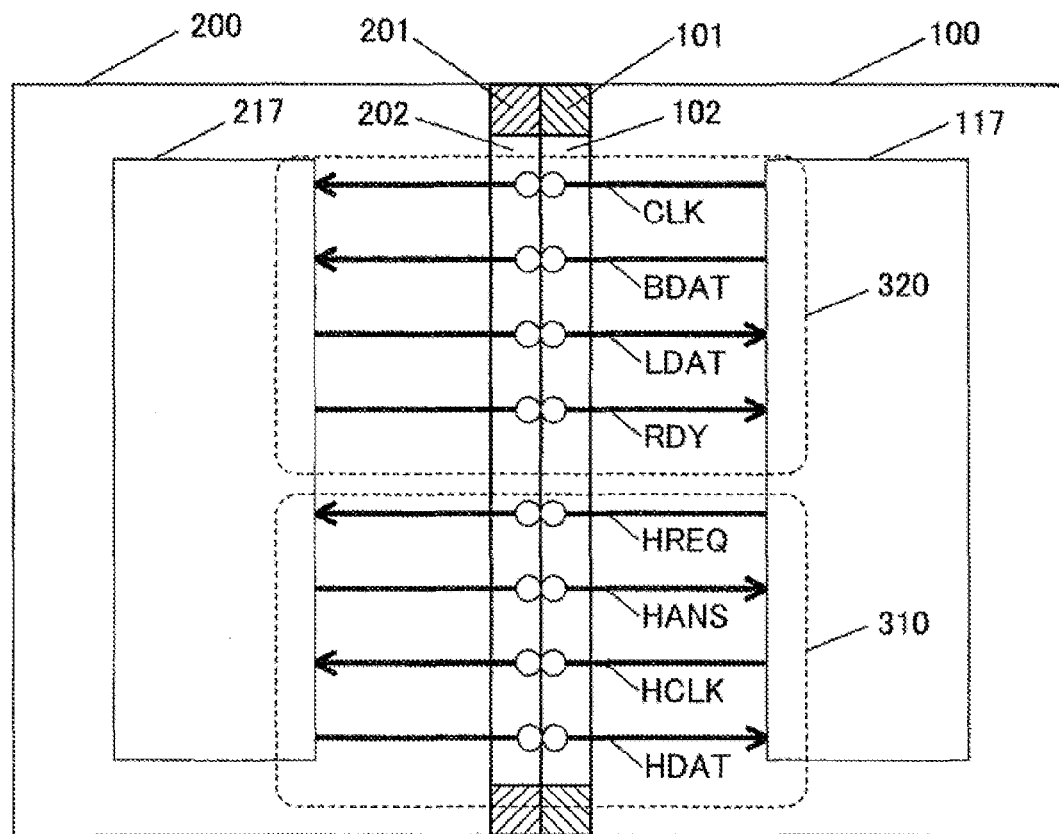
FIG. 3 is a schematic diagram showing connector portions in detail.

FIG. 3 is a schematic diagram showing the connector portions 102 and 202 in detail. As FIG. 3 indicates, the connector portions 102 and 202 each hold eight contact points via which signals are exchanged. Namely, eight signal lines, each corresponding to one contact point at the camera body 100 and one contact point at the lens barrel 200, are present between the camera body 100 and the lens barrel 200. It is to be noted that while a plurality of contact points via which power is supplied from the camera body 100 to the lens barrel 200, for instance, are also present in each connector portion, in addition to these eight contact points, their illustration and explanation are not provided here. In the following description, the eight signal lines will be referred to as HCLK, HREQ, HANS, HDAT, CLK, RDY, BDAT and LDAT, as indicated in FIG. 3.

Among the eight signal lines listed above, HCLK, HREQ, HANS and HDAT constitute a first transmission path 310. Likewise, CLK, RDY, BDAT and LDAT constitute a second transmission path 320. These two transmission paths will be described next.

Through the first transmission path 310, the lens-side transmission/reception unit 217 transmits a lens position signal indicating the position of the focusing lens 210d to the camera body 100. The body-side transmission/reception unit 117 shifts the signal level at HREQ over predetermined cycles (e.g., 1 ms cycles). The lens-side control unit 203 starts communication preparation processing in response to a signal level shift at HREQ. In the communication preparation processing, the lens-side control unit 203 engages the lens position detection unit 213 to detect the position of the focusing lens 210d and output a lens position signal to be transmitted to the camera body 100.

Upon completing the communication preparation processing, the lens-side transmission/reception unit 217 shifts the signal level at HANS. In response to the signal level shift at HANS, the body-side transmission/reception unit 117 outputs a clock signal through HCLK. In synchronization with the clock signal, the lens-side transmission/reception unit 217 outputs the lens position signal to HDAT.

Through the second transmission path 320, control instruction data provided by the camera body 100 are transmitted to the lens barrel 200 and various types of data are transmitted from the lens barrel 200 to the camera body 100. The second transmission path 320 is a full-duplex transmission path. Namely, data from the lens barrel 200 are transmitted to the camera body 100 concurrently as data are transmitted from the camera body 100 to the lens barrel 200.

Whenever the need for data communication through the second transmission path 320 arises, the body-side control unit 103 controls the body-side transmission/reception unit 117 so as to output a clock signal to CLK. For instance, the body-side control unit 103 may control the body-side transmission/reception unit 117 to output a clock signal in synchronization with the image capturing cycles (image output cycles) at the image sensor, so as to obtain the lens information in correspondence to each photographic frame during a photographing operation. This means that if the image capturing cycles at the image sensor are, for instance, sixty fps, the clock signal is output over 16 ms cycles. In this situation, the body-side transmission/reception unit 117 outputs transmission-target data to BDAT in synchronization with the clock signal. The lens-side transmission/reception unit 217, on the other hand, outputs transmission-target data to LDAT in synchronization with the clock signal. It is to be noted that the lens-side transmission/reception unit 217 alters the signal level at RDY depending upon whether or not data transmission/reception is enabled. For instance, the lens-side transmission/reception unit 217 may set the signal level at RDY to H when it is not able to transmit/receive data, whereas it may set the signal level at RDY to L when it is able to transmit/receive data. The body-side transmission/reception unit 117 verifies the signal level at RDY prior to a communication start, and does not begin data communication if the lens-side transmission/reception unit 217 is in a data transmission/reception disabled state.

The body-side transmission/reception unit 117 transmits various types of control signals to the lens barrel 200 through the second transmission path 320 described above. Such control signals include, for instance, a control signal in response to which the focusing lens 210d is moved by an extent corresponding to a specific number of pulses (e.g., ten pulses) toward the infinity side and a control signal in response to which the size of aperture (not shown) is reduced by a specific number of stages (e.g., by 2 stages).

The body-side transmission/reception unit 117 also transmits, through the second transmission path 320, request signals asking for various types of information available at the lens barrel 200. Such request signals include a request signal calling for a focal length signal indicating the current focal length of the image forming optical system 210, a request signal calling for a signal indicating the current aperture value for the aperture (not shown) and a request signal calling for a signal carrying information pertaining to the optical characteristics of the image forming optical system 210. Upon receiving one such request signal, the lens-side transmission/reception unit 217 transmits the corresponding signal to the body side transmission/reception unit 117 via the second transmission path 320.

It is to be noted that the length of time required by the body-side transmission/reception unit 117 for receiving a signal from the lens-side transmission/reception unit 217 through the second transmission path 320 as described above is greater than the length of time required by the body-side transmission/reception unit 117 for receiving the lens position signal through the first transmission path 310, since a request for a specific type of information must be transmitted to the lens-side transmission/reception unit 217 by using the signal lines CLK and BDAT through the second transmission path 320, whereas a data request can be transmitted to the lens-side transmission/reception unit 217 through the first transmission path 310 simply by shifting the signal level at HREQ. This means that the lens-side transmission/reception unit 217 is able to cyclically transmit the lens position signal with a higher level of frequency compared to the transmission frequency with which macro focus-match position information is transmitted.

(Description of the Drive Range of the Lens Drive Unit 212)

Figure 4:
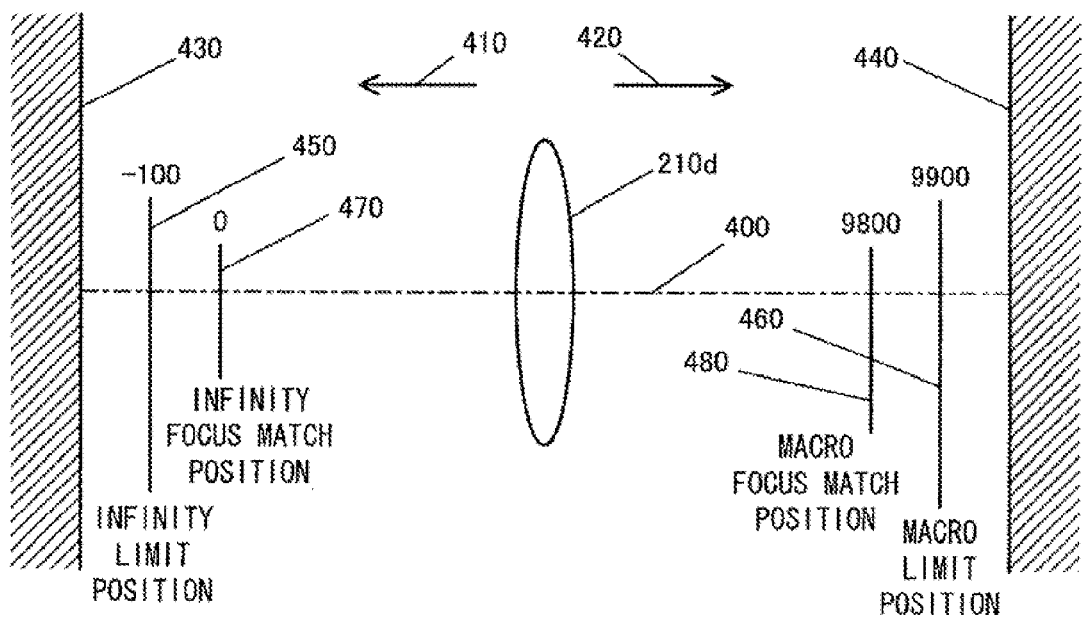
FIG. 4 schematically illustrates the focusing lens drive range.

FIG. 4 schematically indicates the drive range over which the focusing lens 210d is driven. The focusing lens 210d can be driven along an optical axis 400, indicated by the one-point chain line in FIG. 4, toward an infinity side 410 and toward a macro side 420. Stoppers (not shown) are disposed, one at an end 430 on the infinity side 410 and the other at an end 440 on the macro side 420, so as to restrict the movement of the focusing lens 210d. In other words, the focusing lens 210d is allowed to move from the end 430 on the infinity side 410 through the end 440 on the macro side 420.

However, the range over which the focusing lens 210d is actually driven by the lens drive unit 212 is smaller than the range defined by the end 430 and the end 440 as described above. In more specific terms, the lens drive unit 212 drives the focusing lens 210d over a range defined by an infinity limit position 450 set further inward relative to the end 430 on the infinity side 410 and a macro limit position 460 set further inward relative to the end 440 on the macro side 420. Namely, the lens drive unit 212 drives the focusing lens 210d between the macro limit position 460 corresponding to a drive limit position on the macro-side and the infinity limit position 450 corresponding to a drive limit position on the infinity side.

The infinity limit position 450 is set further outward relative to an infinity focus match position 470, i.e., further toward the end 430. It is to be noted that the infinity focus match position 470 is the position assumed by the focusing lens 210*d* to achieve focus on subjects in the far distance, i.e., the position of the focusing lens 210*d* that corresponds to the utmost infinity-side position, at which the image forming optical system 210 is still able to achieve focus match. The infinity limit position 450 is set at such a position, since the focus evaluation value may peek at the infinity focus match position 470 when automatic focus adjustment is executed through the hill-climbing method. If the infinity focus match position 470 is allowed to match the infinity limit position 450, the focus evaluation value peaking at the infinity focus match position 470 will not be recognized as a peak and, for this reason, the infinity focus match position 470 and the infinity limit position 450 should not be the same. Likewise, the macro limit position 460 is set further outward relative to a macro focus match position 480, i.e., further toward the end 440. The macro focus match position 480 is assumed by the focusing lens 210*d* to achieve focus on a macro subject, i.e., corresponding to the utmost macro-side position at which a focus match can still be achieved by the image forming optical system 210.

In the embodiment, the position of the focusing lens 210*d* is indicated by the number of signal pulses provided to the lens drive unit 212. In addition, the number of pulses is counted in reference to the infinity focus match position 470 set as the origin point (reference point). For instance, the infinity limit position 450 is a −100-pulse position, the macro focus match position 480 is a 9800-pulse position and the macro limit position 460 is a 9900-pulse position, in the example presented in FIG. 4. In this example, a 10,000-pulse signal should be provided to the lens drive unit 212 in order to move the focusing lens 210*d*, currently at the infinity limit position 450, to the macro limit position 460.

It will be obvious that numerical values different from those cited above may be taken for the infinity limit position 450, the macro limit position 460 and the macro focus match position 480. Furthermore, different values may be taken depending upon the lens barrel type or from one lens barrel to another.

(Description of the Position Information Tables)

The body-side control unit 103 executing, for instance, automatic focus adjustment, needs to ascertain the infinity limit position 450, the macro limit position 460 and the infinity focus match position 470. However, the focal length of the image forming optical system 210 is variable as described earlier and the macro focus match position 480 changes in correspondence to the focal length.

Accordingly, values taken for the macro focus match position 480, each in correspondence to a given focal length, are stored in the form of a position information table in the ROM 215 at the lens barrel 200 in advance, and the macro focus match position 480 corresponding to the current focal length is transmitted from the lens-side transmission/reception unit 217 to the body-side transmission/reception unit 117 on a regular basis through the second transmission path.

Figure 5A:
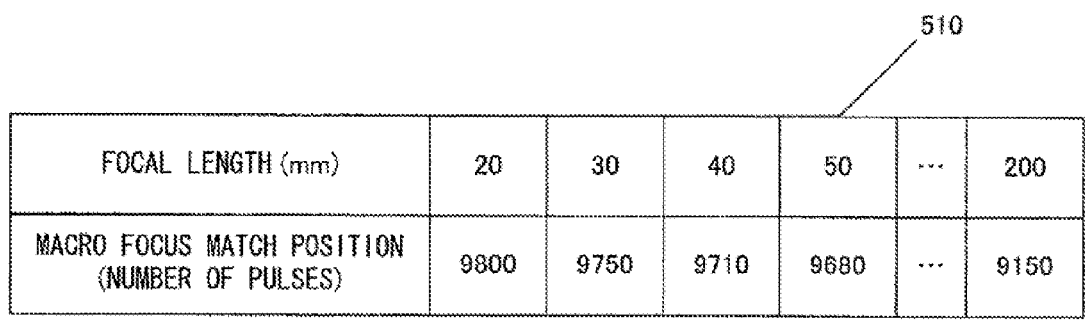
FIGS. 5A and 5B show position information stored in a ROM in the exchangeable lens.
Figure 5B:
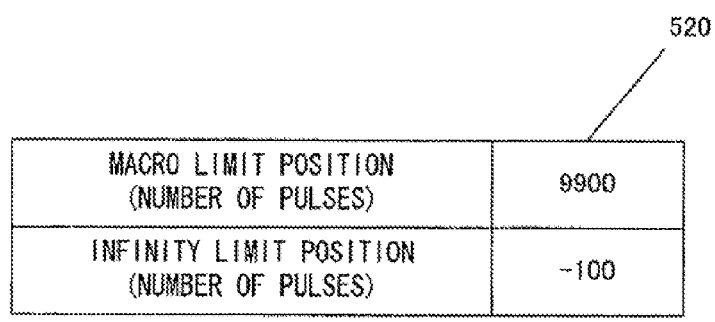

FIGS. 5A and 5B show the position information stored in the ROM 215. A position information table 510 shown in FIG. 5A is stored in the ROM 215 in advance. In the position information table 510, the macro focus match position is correlated to the focal length of the image forming optical system 210. The position information table 510 in FIG. 5A indicates that when the focal length of the image forming optical system 210 is, for instance, 20 mm, the 9800-pulse position is taken as the macro focus match position. In addition, when the focal length is 30 mm, a 9750-pulse position is taken as the macro focus match position.

The lens-side control unit 203 obtains the macro focus match position, which corresponds to the current focal length indicated in the focal length signal output from the focal length detection unit 214 following a change in the focal length of the image forming optical system 210, from the position information table 510, and stores the macro focus match position thus obtained into the RAM 216. Then, as the lens-side transmission/reception unit 217 receives a macro focus match position request signal from the camera body 100 via the second transmission path 320, the lens-side control unit 203 controls the lens-side transmission/reception unit 217 accordingly so as to prompt the lens-side transmission/reception unit 217 to transmit the macro focus match position information stored in the RAM 216 to the body-side transmission/reception unit 117.

A limit position information table 520 shown in FIG. 5B is also stored in the ROM 215. The macro limit position 460 and the infinity limit position 450 are held in the limit position information table 520.

When storing the macro focus match position into the RAM 216, the lens-side control unit 203 also stores the macro limit position 460 and the infinity limit position 450 held in the limit position information table 520 as described above, into the RAM 216. Subsequently, the lens-side control unit 203 controls the lens-side transmission/reception unit 217, having received a request signal from the camera body 100 so that the lens-side transmission/reception unit 217 transmits the three types of information stored in the RAM 216 all together to the body-side transmission/reception unit 117. Based upon the information thus received at the body-side transmission/reception unit 117, the body-side control unit 103 determines the number of pulses needed to move the focusing lens 210*d* to the target position and also determines the scanning range to be set for the focusing lens 210*d* for the contrast-based focus detection processing.

It is to be noted that the position information table 510 does not need to hold all the numerical values that may be taken for the macro focus match position in correspondence to all possible focal lengths for the image forming optical system 210. If a focal length that cannot be found in the position information table 510 is set, the lens-side control unit 203 will be able to calculate the macro focus match position corresponding to the actual focal length set for the image forming optical system 210 through an interpolation operation executed based upon the values representing the macro focus match positions corresponding to focal lengths immediately preceding and succeeding the actual focal length.

(Optical Characteristics of the Image Forming Optical System 210)

Depending upon its optical characteristics, the image forming optical system 210 may, for instance, manifest different degrees of transmittance in correspondence to varying wavelengths of subject light, or it may manifest distortion, peripheral shading (vignetting or peripheral brightness reduction), magnification factor chromatic aberration or the like. Furthermore, the optical characteristics of the image forming optical system 210 are bound to vary depending upon the model of the lens barrel or the type of lens barrel 200. Accordingly, information related to the optical characteristics of the image forming optical system 210 is transmitted from the lens barrel 200 to the camera body 100 in the embodiment. Then, various types of correction processing are executed at the camera body 100 based upon the information thus received. The whole process will be described in specific detail below.

Figure 7:
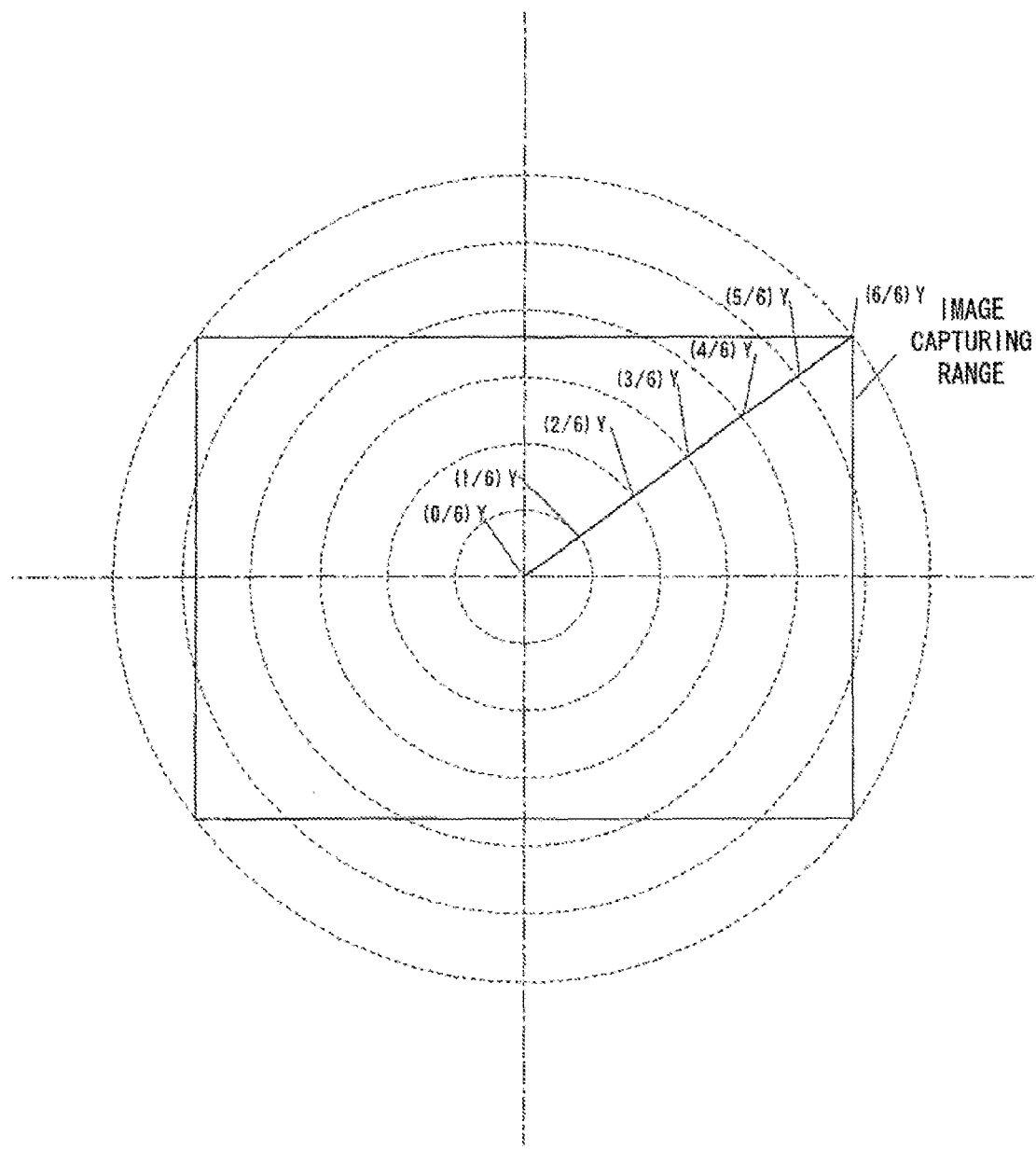
FIG. 7 illustrates the image height relative to the peripheral shading characteristics information stored in the ROM in the exchangeable lens.

Information pertaining to the optical characteristics of the image forming optical system 210 is stored in advance in the ROM 215. The following description is given in reference to information related to the peripheral shading characteristics and the magnification factor chromatic aberration characteristics among various types of information pertaining to the optical characteristics of the image forming optical system 210 that may be stored into the ROM 215. FIG. 6 presents an example of a peripheral shading information table holding information pertaining to the peripheral shading characteristics, which is stored in the ROM 215. A peripheral shading information table 530 shown in FIG. 6 indicates varying degrees of shading to manifest when the aperture value is set at F 4.5 with an image height ($2/6$)Y measured from the center of a substantially rectangular image capturing range with Y representing the image height ranging from the center of the substantially rectangular image capturing range to one of the four corners of the image capturing range, as shown in FIG. 7. The optical axis of the subject light flux corresponds to the center of the image capturing range. It is to be noted that in the following description, "the image height ($2/6$)Y measured from the center of the image capturing range" may be simply referred to as the "image height ($2/6$)Y".

The degree of peripheral shading, which is affected by the image height and the aperture value, is also bound to vary depending upon the focal length and the focus position (photographic distance). Accordingly, peripheral shading information corresponding to a given image height and a given aperture value such as that held in the peripheral shading information table 530 shown in FIG. 6, is stored in the ROM 215 as data in a matrix format with the focal length and the photographic distance taken as parameters in the embodiment. It is to be noted that while the field in each square in the peripheral shading information table 530 in FIG. 6 is left blank so as not to crowd the illustration, a value representing the quantity of light (hereafter referred to as a peripheral shading value), with 1 representing the quantity of light at the center of the image capturing range (i.e., at an image height of 0), is entered in each field in the actual peripheral shading information table 530.

In correspondence to each of a plurality of aperture values (e.g., six aperture values), peripheral shading information tables 530 for four different image heights, e.g., ($2/6$)Y, ($4/6$)Y, ($5/6$)Y and ($6/6$)Y, are stored in the ROM 215. In addition, the lens-side control unit 203 obtains, through calculation, peripheral shading information for an image height of, for instance, ($3/6$)Y at the current photographic distance and the current focal length based upon the peripheral shading information tables 530 for the image heights ($2/6$)Y and ($4/6$)Y, as will be described in detail later. The lens-side control unit 203 then controls the various units so as to transmit peripheral shading information for the five different image heights ($2/6$)Y through ($6/6$)Y provided in ($1/6$)Y pitches in correspondence to the current photographic distance and the current focal length, from the lens barrel 200 to the camera body 100.

In the embodiment, four peripheral shading information tables 530 for four different image heights, e.g., ($2/6$)Y, ($4/6$)Y, ($5/6$)Y and ($6/6$)Y, are stored into the ROM 215 in correspondence to each aperture value for the following reasons. In addition, the peripheral shading information for five different image heights, i.e., ($2/6$)Y, ($3/6$)Y, ($4/6$)Y, ($5/6$)Y and ($6/6$)Y in ($1/6$)Y pitches, is transmitted from the lens barrel 200 to the camera body 100 for the following reasons.

(1) While the accuracy of peripheral shading correction processing executed at the camera body 100, as will be described later, can be improved by increasing the number of peripheral shading information tables 530 stored in correspondence to each aperture value to, for instance, six or more, the ROM 215 will need to have a greater storage capacity to accommodate the greater number of peripheral shading information tables. In addition, the load of communication carried out with the camera body 100 will become heavy.

(2) If, on the other hand, the number of peripheral shading information tables 530 stored in correspondence to each aperture value is reduced to fewer than four, a ROM 215 with a smaller storage capacity can be used and the load of communication carried out with the camera body 100 will be lightened. However, it would require additional measures for improving the accuracy of the peripheral shading correction processing (in particular, correction processing executed for the captured image) executed at the camera body 100.

(3) By setting constant image height pitches, i.e., ($1/6$)Y pitches, for the peripheral shading information to be transmitted to the camera body 100, the arithmetic operation executed at the camera body 100 to determine the peripheral shading characteristics at an image height, in correspondence to which no peripheral shading information table 530 is available, through linear interpolation to be described later, can be simplified.

(4) Since peripheral shading does not tend to occur near the center of the image capturing range, there is little need for a peripheral shading information table 530 corresponding to an image height near the image capturing range center. For this reason, while peripheral shading information tables 530 are created over constant image height pitches of ($1/6$)Y pitches and ($2/6$)Y pitches, peripheral shading information tables 530 corresponding to the image heights ($1/6$)Y and ($3/6$)Y can be omitted.

(5) As will be explained later, as long as the peripheral shading values for three image heights; the image height ($1/3$)Y (i.e., ($2/6$)Y), the image height ($2/3$)Y (i.e., ($4/6$)Y) and the image height ($3/3$)Y (i.e., ($6/6$)Y) are available for the exposure calculation executed during a photographing operation, correction processing can be executed so as to obtain the optimal exposure value. However, if the number of peripheral shading information tables 530 available in correspondence to each aperture value is small, it will be difficult to improve the accuracy of the peripheral shading correction processing executed at the camera body 100 for a captured image. For this reason, a peripheral shading information table 530 for a position between the image height ($2/3$)Y, and the image height ($3/3$)Y, i.e., for the image height ($5/6$)Y, is added. Furthermore, peripheral shading information for an image height between, for instance, the image height ($1/3$)Y (=($2/6$)Y) and the image height ($2/3$)Y, (=($4/6$)Y), i.e., the image height ($3/6$)Y, is obtained through calculation executed at the lens barrel 200 based upon the peripheral shading information tables 530 at the image height ($1/3$)Y and the image height ($2/3$)Y.

Figure 9:
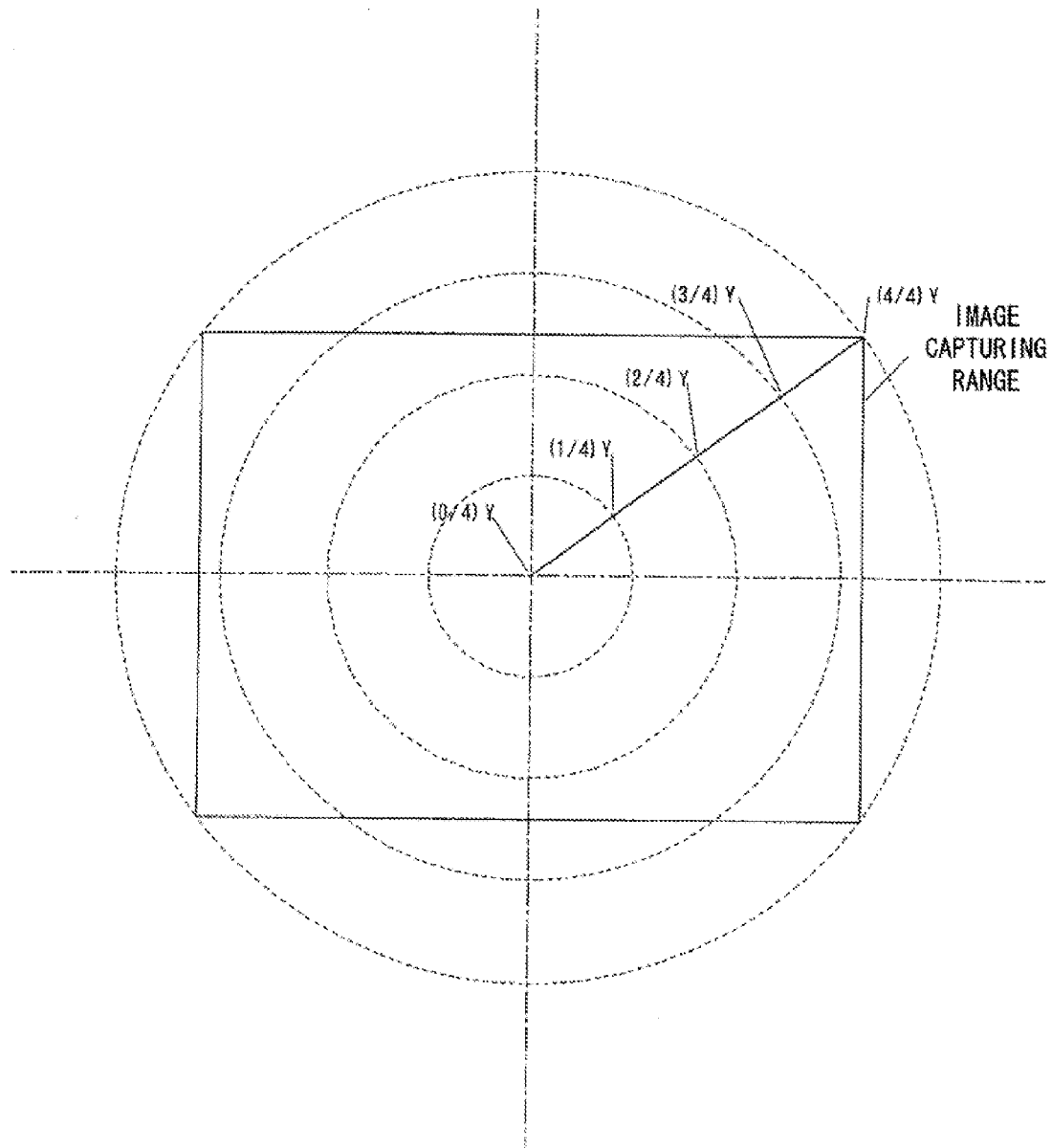
FIG. 9 illustrates the image height relative to the magnification factor chromatic aberration information stored in the ROM in the exchangeable lens.

FIG. 8 presents an example of a magnification factor chromatic aberration information table holding information pertaining to magnification factor chromatic aberration characteristics stored in the ROM 215. A magnification factor chromatic aberration information table 540 shown in FIG. 8 indicates varying degrees of magnification factor chromatic aberration to manifest with red light at an image height ($2/4$)Y measured from the center of the substantially rectangular image capturing range with Y representing the image height ranging from the center of the image capturing range (from the optical axis of the subject light flux) to one of the four corners of the image capturing range, as shown in FIG. 9.

The degree of magnification factor chromatic aberration, which is affected by the wavelength of light and the image height, is also bound to vary depending upon the focal length and the photographic distance. Accordingly, magnification factor chromatic aberration information corresponding to a given color (wavelength) and a given image height, such as that held in the magnification factor chromatic aberration information table 540 shown in FIG. 8, is stored in the ROM 215 as data in a matrix format with the focal length and the photographic distance taken as parameters in the embodiment. It is to be noted that while the field in each square in the magnification factor chromatic aberration information table 540 in FIG. 8 is left blank so as not to crowd the illustration, a value indicating the degree of aberration with reference to green light aberration is entered in each field in the actual magnification factor chromatic aberration information table 540.

In the ROM 215, magnification factor chromatic aberration information tables 540 for three different image heights ($2/4$)Y, ($3/4$)Y and ($4/4$)Y are stored in correspondence to red light and blue light.

(Transmission of Information Pertaining to the Optical Characteristics of the Image Forming Optical System 210)

As explained earlier, upon receiving, via the second transmission path 320, a request signal calling for a signal carrying information pertaining to the optical characteristics of the image forming optical system 210, the lens-side control unit 203 collects the requested information pertaining to the optical characteristics of the image forming optical system 210 from various units. The lens-side control unit 203 then transmits the collected information to the camera body 100 through the second transmission path 320. The lens-side control unit 203 collects or obtains through calculation information pertaining to the peripheral shading characteristics and transmits the peripheral shading information to the camera body 100 through the second transmission path 320 as described below.

Upon receiving a request signal calling for a signal carrying the peripheral shading information through the second transmission path 320, the lens-side control unit 203 calculates the current photographic distance and the current focal length of the image capturing optical system 210 based upon the lens position signal and the focal length signal respectively output from the lens position detection unit 213 and the focal length detection unit 214. In addition, upon receiving, via the second transmission path 320, a request signal calling for a signal carrying information pertaining to the peripheral shading characteristics, the lens-side control unit 203 calculates the current aperture value at the iris aperture (not shown) based upon a signal indicating the aperture value currently set for the iris aperture, which is output from an aperture value detection unit (not shown).

The lens-side control unit 203 then obtains the peripheral shading values corresponding to the current photographic distance and focal length calculated as described above, from the four peripheral shading information tables 530 for the image heights ($2/6$)Y, ($4/6$)Y, ($5/6$)Y and ($6/6$)Y corresponding to the current aperture value having been calculated, among the plurality of peripheral shading information tables 530. It is to be noted that if the current photographic distance or focal length having been calculated does not match with any of the photographic distances or focal lengths discretely set in the peripheral shading information tables 530, the lens-side control unit 203 will obtain the peripheral shading values at the current photographic distance and focal length through linear interpolation (or another type of interpolation) executed as required by referencing the peripheral shading information tables 530.

In addition, the lens-side control unit 203 obtains through the optimal interpolation the peripheral shading information for the image height ($3/6$)Y at the current photographic distance and focal length based upon the peripheral shading information for the image heights ($2/6$)Y and ($4/6$)Y having been obtained as has been described above. It is to be noted that the interpolation executed when obtaining the peripheral shading information for the image height ($3/6$)Y may be linear interpolation, quadratic interpolation or cubic interpolation. Furthermore, the interpolation (e.g., spline interpolation) may be executed by additionally using the peripheral shading information for the image heights ($5/6$)Y and ($6/6$)Y.

Subsequently, the lens-side control unit 203 controls the lens-side transmission/reception unit 217 so as to transmit the peripheral shading values having been obtained as described above, through the second transmission path 320. As a result, information pertaining to the peripheral shading characteristics is transmitted to the camera body 100.

For instance, when the current aperture value, photographic distance and focal length having been calculated are respectively F4.5, L4 and f7, the lens-side control unit 203 obtains the peripheral shading value corresponding to the photographic distance L4 and the focal length f7 by reading the peripheral shading information table 530 shown in FIG. 6, which indicates the degrees of peripheral shading for the aperture value F4.5 at the image height ($2/6$)Y measured from the image capturing range center. The lens-side control unit 203 further obtains peripheral shading values corresponding to the photographic distance L4 and the focal length f7 by reading the individual peripheral shading information tables 530 indicating the degrees of peripheral shading for the aperture value F4.5 at various image heights ($4/6$)Y through ($6/6$)Y measured from the image capturing range center.

The lens-side control unit 203 then calculates the peripheral shading value for the image height ($3/6$)Y in correspondence to the aperture value F4.5, the photographic distance L4 and the focal length f7 through the optimal interpolation executed based upon, for instance, the peripheral shading values having been obtained for the image heights ($2/6$)Y and ($4/6$)Y.

Subsequently, the lens-side control unit 203 controls the lens-side transmission/reception unit 217 so as to transmit, via the second transmission path 320, the peripheral shading values having been obtained in correspondence to the five different image heights ($2/6$)Y, ($3/6$)Y, ($4/6$)Y, ($5/6$)Y and ($6/6$)Y.

It is to be noted that the information pertaining to the magnification factor chromatic aberration is transmitted in much the same way as the peripheral shading information transmitted as described above.

(Corrections Processing Executed Based upon the Information Pertaining to the Optical Characteristics of the Image Forming Optical System 210)

As the peripheral shading values corresponding to the five different image heights ($2/6$)Y, ($3/6$)Y, ($4/6$)Y, ($5/6$)Y and ($6/6$)Y obtained as described above are received at the body-side transmission/reception unit 117 via the second transmission path 320, the body-side control unit 103 stores the received peripheral shading values into the RAM 119. It is to be noted that each time the peripheral shading values, which are cyclically transmitted from the lens barrel 200 over regular intervals, are received on the body side, the body-side control unit 103 overwrites the latest peripheral shading values over the previous values stored in the RAM 119 for an update. The magnification factor chromatic aberration information is updated in a similar manner.

The body-side control unit 103 executes correction processing so as to obtain the optimal exposure value in the exposure calculation during a photographing operation by referencing the peripheral shading values for three image heights (2/6)Y, (4/6)Y and (6/6)Y among the peripheral shading values stored in the RAM 119. In other words, the body-side control unit 103, for executing the exposure calculation during a photographing operation based upon pixel output data provided from the image capturing pixels at the image sensor 104, calculates the exposure value by referencing the peripheral shading values corresponding to the three image heights as described above. Namely, the body-side control unit 103 executes the exposure calculation so as to achieve the optimal exposure corresponding to the brightness of the subject by referencing the peripheral shading information for image height positions measured from the image capturing range center, which are equivalent to even-number multiples of (1/6)Y, i.e., twice (1/6)Y, four times (1/6)Y and six times (1/6)Y.

In addition, the body-side control unit 103 executes correction processing for the image obtained through image capturing operation by referencing the peripheral shading values corresponding to the five different image heights (2/6)Y through (6/6)Y stored in the RAM 119. In other words, following the image capturing operation, the body-side control unit 103 executes the image processing so as to minimize the adverse effect of peripheral shading on the captured image by referencing the peripheral shading values corresponding to the five image heights. In more specific terms, the body-side control unit 103 calculates gain values to be used to correct peripheral shading at the various image heights by referencing the peripheral shading values for the five image heights (2/6)Y through (6/6)Y stored in the RAM 119. The body-side control unit 103 then executes the image processing for minimizing the adverse effect of peripheral shading on the captured image by referencing the gain values having been calculated. It is to be noted that the peripheral shading values stored in the RAM 119 are discrete values corresponding to the five image heights and, accordingly, the body-side control unit 103 calculates a gain value to be used for purposes of peripheral shading correction at a given image height in the 0 through Y range by executing linear interpolation as necessary.

The body-side control unit 103 executes correction processing for the captured image by referencing the magnification factor chromatic aberration information corresponding to the three image heights (2/4)Y, (3/4)Y and (4/4)Y stored in the RAM 119. In other words, following the image-capturing operation, the body-side control unit 103 executes the image processing for minimizing the adverse effect of magnification factor chromatic aberration on the captured image by referencing the magnification factor chromatic aberration information for the three image heights described earlier.

The following operational effects are achieved with the camera system in the first embodiment.

(1) The lens barrel 200 (exchangeable lens) is equipped with the ROM 215 functioning as an optical characteristics storage unit where information pertaining to the optical characteristics of the exchangeable lens 200, including at least information pertaining to the peripheral shading characteristics of the exchangeable lens 200, is stored, the lens-side control unit 203 functioning as an optical characteristics information generation unit that generates information pertaining to optical characteristics of the exchangeable lens 200, to be transmitted to the camera body 100, based upon the optical characteristics information stored in the optical characteristics information storage unit, and the lens-side transmission/reception unit 217 functioning as an optical characteristics transmission unit that transmits information pertaining to the optical characteristics of the exchangeable lens 200, having been generated by the optical characteristics information generation unit, to the camera body 100. In the optical characteristics storage unit peripheral shading information for only some image heights is stored as the information pertaining to the peripheral shading characteristics of the exchangeable lens 200 but peripheral shading information corresponding to at least one position, among five image height positions measured from the center of a substantially rectangular image capturing range, equivalent to integral multiples of y1, which represents the image height equal to 1/6 of the image height ranging from the center of the image capturing range to one of the four corners of the image capturing range, i.e., twice y1, three times y1, four times y1, five times y1 and six times y1, is not stored. The optical characteristics information generation unit generates the peripheral shading information for the five different image height positions to be transmitted to the camera body 100 based upon the peripheral shading information indicating the peripheral shading characteristics of the exchangeable lens 200 stored in the optical characteristics storage unit. The optical characteristics transmission unit, in turn, transmits the peripheral shading information for the five image height positions, generated by the optical characteristics information generation unit, to the camera body 100. In more specific terms, peripheral shading information tables 530 for four different image heights (2/6)Y, (4/6)Y, (5/6)Y and (6/6)Y, for instance, are stored in the ROM 215 as the peripheral shading information, and peripheral shading information for the image height (3/6)Y is obtained through calculation executed by referencing the peripheral shading information tables 530. Then, the peripheral shading information for the four image heights (2/6)Y, (4/6)Y, (5/6)Y and (6/6)Y obtained by reading the peripheral shading information tables 530 and the peripheral shading information for the image height (3/6)Y generated through calculation are transmitted to the camera body 100. Through these measures, enough information to assure the required level of accuracy for the peripheral shading correction processing executed at the camera body 100 can be provided while keeping down the memory capacity required in the ROM 215.

(2) The peripheral shading information tables 530 are provided with uniform image height pitches, i.e., (1/6)Y pitches and (2/6)Y pitches. As a result, the load of arithmetic operation executed by the lens-side control unit 203 in order to obtain the peripheral shading value corresponding to the current photographic distance and focal length through the optimal linear interpolation by referencing the peripheral shading information tables 530 as described above can be reduced.

(3) The peripheral shading values for the five different image heights, corresponding to the current aperture value, photographic distance and focal length, alone are transmitted to the camera body 100. This means that since the peripheral shading information needed at the camera body 100 alone can be transmitted, the volume of data for transmission can be kept down. As a result, the communication load can be reduced and the various operations can be executed at the camera body 100 with better response.

(4) If the current photographic distance or focal length does not match any of the photographic distances or focal lengths that are set discretely in the peripheral shading information tables 530, the lens-side control unit 203 obtains the peripheral shading values corresponding to the current photographic distance and focal length through linear interpolation executed by referencing the peripheral shading information tables 530. Thus, the required storage capacity in the ROM 215 can be reduced.

(5) The lens position detection unit 213 detects the position of the focusing lens 210d and outputs a lens position signal. The lens-side transmission/reception unit 217 cyclically transmits the lens position signal, output from the lens position detection unit 213, to the camera body 100 through the first transmission path 310. The information indicating the macro focus match position, the macro limit position and the infinity limit position and the information pertaining to the optical characteristics of the image forming optical system 210, on the other hand, are transmitted to the camera body 100 via the second transmission path 320 which is different from the first transmission path 310. Through these measures, it is ensured that the transmission of information pertaining to the optical characteristics of the image capturing optical system 210 and the like does not interfere with the transmission of the lens position signal.

(6) The body-side control unit 103 requests that the lens position signal be transmitted by shifting the signal level at a specific signal line instead of by transmitting data expressing a lens position signal transmission request to the lens-side control unit 203. Thus, the request for lens position signal transmission can be issued without necessitating any additional data communication.

(7) The body-side control unit 103 executes correction processing for obtaining the optimal exposure value in the exposure calculation during a photographing operation by referencing the peripheral shading values corresponding to three different image heights (2/6)Y, (4/6)Y and (6/6)Y among the peripheral shading values stored in the RAM 119. In addition, the body-side control unit 103 executes the peripheral shading correction processing for a captured image by referencing the peripheral shading values for the five different image heights (2/6)Y through (6/6)Y stored in the RAM 119. Since the common peripheral shading values can be used for the exposure calculation and the image processing, the volume of data that need to be received from the lens barrel 200 can be reduced, which, in turn, leads to a reduction in the communication load and the load on the body-side control unit 103 executing the exposure calculation and the image processing. Furthermore, since comprehensive peripheral shading correction processing is enabled through the exposure calculation and the image processing, the quality of images obtained through image-capturing operations can be improved.

(8) The lens-side transmission/reception unit 217 cyclically transmits the lens position signal with a frequency higher than the transmission frequency at which information indicating the macro focus match position and the like is transmitted. Consequently, automatic focus adjustment can be executed with improved response.

Variations of the First Embodiment (1) In the description provided above, the peripheral shading information is stored into the ROM 215 in the form of peripheral shading information tables such as the peripheral shading information table 530 shown in FIG. 6, in correspondence to four image heights (2/6)Y, (4/6)Y, (5/6)Y and (6/6)Y. However, the present invention is not limited to this example. For instance, peripheral shading information tables 530 corresponding to, for instance, four image heights (3/6)Y, (4/6)Y, (5/6)Y and (6/6)Y may be stored into the ROM 250, and in such a case, the peripheral shading values corresponding to the image height (2/6)Y may be substituted with, for instance, the peripheral shading values for the image height (3/6)Y. As a further alternative, peripheral shading information tables 530 corresponding to, for instance, three image heights (2/6)Y, (4/6)Y and (6/6)Y may be stored into the ROM 215 and the peripheral shading values for the image heights (3/6)Y and (5/6)Y may be calculated through, for instance, interpolation based upon the peripheral shading values stored in the ROM 215.

In addition, while the peripheral shading information tables 530 in the embodiment described above are provided over image height pitches equal to Y multiplied by 1/integer, i.e., over (1/6)Y pitches and (2/6)Y pitches (=(1/3)Y) pitches, the present invention is not limited to this example. In other words, the peripheral shading information tables 530 may be provided over image height pitches that do not match Y multiplied by 1/integer, or the peripheral shading information tables 530 may be provided with varying image height pitches instead of uniform image height pitches. The lens-side control unit 203, working in conjunction with peripheral shading information tables 530 provided over image height pitches different from those in the embodiment described above, should be able to obtain the peripheral shading information for the five image heights (2/6)Y through (6/6)Y over (1/6)Y pitches through interpolation or substitution.

It is to be noted that if a point of inflection occurs in a peripheral shading graph with the image height indicated along the horizontal axis thereof and the light quantity indicated along the vertical axis thereof, a peripheral shading information table 530 corresponding to an image height in the vicinity of the inflection point, for instance, should be stored into the ROM 215. In conjunction with such peripheral shading information tables, the error occurring in the calculation executed to obtain the peripheral shading information for the five image heights (2/6)Y through (6/6)Y over (1/6)Y pitches can be minimized even if the peripheral shading information tables 530 are provided over image height pitches different from those in the embodiment.

(2) In the description given above, the peripheral shading information tables 530 are provided over image height pitches of (1/6)Y pitches. In addition, peripheral shading information, for at least one position among the five image height positions, i.e., (2/6)Y, (3/6)Y, (4/6)Y, (5/6)Y and (6/6)Y equal to integral multiples of (1/6)Y obtained by multiplying (1/6)Y by integers in a range of 2 to 6, is not stored, and the peripheral shading information corresponding to such a position is obtained through calculation executed based upon the peripheral shading information for the other positions, that is stored. However, the present invention is not limited to this example. Namely, the present invention may be adopted in conjunction with any information pertaining to optical characteristics of the lens barrel 200 that includes, at least, information pertaining to the peripheral shading characteristics of the lens barrel 200, with at least some of the peripheral shading information to be transmitted to the camera body 100, corresponding to image height positions defined by dividing the full image height ranging from the image capturing range center to one of the four corners of the image capturing range stored into the ROM 215 as the peripheral shading information. For instance, the image height pitches over which the peripheral shading information tables 530 are provided may be expressed as (1/N)Y pitches (N is an integer equal to or greater than 3), instead of (1/6)Y pitches. The same principle also applies to the peripheral shading information utilized at the camera body 100. It is to be noted that N in (1/N)Y must be an integer equal to or greater than 3 for the following reason. Namely, N is equal to 6, the peripheral shading information tables 530 are provided over image height pitches of (1/N)Y pitches, the peripheral shading information for at least one image height position among (N−1) image height positions, which are integral multiples obtained by multiplying (1/N)Y by an integer which is equal to or greater than 2 and equal to or less than N, is not stored and the peripheral shading information for such a position is generated through calculation executed based upon the peripheral shading information for the other positions that is stored in this embodiment. However, the principle of the present invention cannot be supported when N is 2 or 1.

(3) The embodiment described above may be adopted in a video shooting operation as well as in a still image shooting operation.

(4) The embodiment and the variations thereof described above may be adopted in any conceivable combination.

It is to be noted that the present invention is not limited in any way whatsoever to the particulars of the embodiment described above, and it may be adopted in conjunction with an exchangeable lens having any of various structures that can be detachably mounted at the camera body, as long as it comprises an optical characteristics storage unit where optical characteristics information pertaining to optical characteristics of the exchangeable lens including, at least, information pertaining to peripheral shading characteristics of the exchangeable lens, is stored, an optical characteristics information generation unit that generates information pertaining to optical characteristics of the exchangeable lens to be transmitted to the camera body based upon the optical characteristics information stored in the optical characteristics storage unit, and an optical characteristics transmission unit that transmits information pertaining to the optical characteristics of the exchangeable lens, having been generated by the optical characteristics information generation unit, to the camera body, characterized in that peripheral shading information for only some image heights is stored as the information pertaining to the peripheral shading characteristics of the exchangeable lens into the optical characteristics storage unit, but peripheral shading information for at least one image height position among the five image height positions equivalent to integral multiples of y1, which represents an image height equal to ⅙ of an image height measured from the center of a substantially rectangular image capturing range to one of the four corners of the image capturing range, obtained by multiplying y1 by integers in a range 2 through 6, is not stored in the optical characteristics storage unit, that the optical characteristics information generation unit generates the peripheral shading information for the five image height positions to be transmitted to the camera body based upon the information pertaining to the peripheral shading characteristics of the exchangeable lens stored in the optical characteristics storage unit and that the optical characteristics transmission unit transmits the peripheral shading information for the five image height positions generated by the optical characteristics information generation unit.

Furthermore, the present invention is not limited in any way whatsoever to the particulars of the embodiment described above and may be adopted in a camera system having any of various structures, as long as the camera system includes a camera body and an exchangeable lens detachably mounted at the camera body, the exchangeable lens comprises an optical characteristics storage unit where optical characteristics information pertaining to optical characteristics of the exchangeable lens including, at least, information pertaining to peripheral shading characteristics of the exchangeable lens, is stored, an optical characteristics information generation unit that generates information pertaining to optical characteristics of the exchangeable lens, to be transmitted to the camera body, based upon the optical characteristics information stored in the optical characteristics storage unit, and an optical characteristics transmission unit that transmits information pertaining to the optical characteristics of the exchangeable lens, having been generated by the optical characteristics information generation unit, to the camera body, peripheral shading information for only some image heights is stored as the information pertaining to the peripheral shading characteristics of the exchangeable lens into the optical characteristics storage unit, but peripheral shading information at, at least one image height position among five image height positions equivalent to integral multiples of y1, which represents an image height equal to ⅙ of an image height measured from the center of a substantially rectangular image capturing range to one of the four corners of the image capturing range, obtained by multiplying y1 by integers in a range of 2 through 6, is not stored in the optical characteristics storage unit, the optical characteristics information generation unit generates the peripheral shading information for the five image height positions to be transmitted to the camera body based upon the information pertaining to the peripheral shading characteristics of the exchangeable lens stored in the optical characteristics storage unit, the optical characteristics transmission unit transmits the peripheral shading information for the five image height positions generated by the optical characteristics information generation unit, the camera body comprises an exposure calculation unit that executes exposure calculation so as to achieve optimal exposure in correspondence to the subject brightness, an image processing unit that executes the image processing for image data obtained through image capturing operation and an optical characteristics information reception unit that receives, at least, peripheral shading information for the five image height positions among various types of information pertaining to the optical characteristics of the exchangeable lens, from the optical characteristics transmission unit, the exposure calculation unit executes exposure calculation so as to achieve the optimal exposure corresponding to the subject brightness by referencing peripheral shading information for image height positions measured from the center of the image capturing range equivalent to even-number multiples of y1 obtained by multiplying y1 by 2, 4 and 6 among sets of peripheral shading information corresponding to the five image height positions received at the optical characteristics information reception unit, and the image processing unit executes the image processing on the image data by referencing the peripheral shading information for the five image height positions received at the optical characteristics information reception unit.

In addition, the present invention is not limited in any way whatsoever to the particulars of the embodiment described above, and it may be adopted in conjunction with an exchangeable lens having any of various structures that can be detachably mounted at a camera body, as long as it comprises an optical characteristics storage unit where peripheral shading information constituting a minimum component of information pertaining to optical characteristics of the exchangeable lens, to be transmitted to the camera body and indicating peripheral shading characteristics manifesting at, at least, some of image height positions defined by dividing an image height measured from the center of an image capturing range to one of the four corners of the image capturing range into a predetermined number of blocks, is stored, an optical characteristics information generation unit that generates peripheral shading information to be transmitted to the camera body based upon the peripheral shading information stored in the optical characteristics storage unit, and an optical characteristics transmission unit that transmits the peripheral shading information generated by the optical characteristics generation unit to the camera body.

Moreover, the present invention is not limited in any way whatsoever to the particulars of the embodiment described above and may be adopted in a camera system having any of various structures, as long as the camera system includes a camera body and an exchangeable lens detachably mounted at the camera body, the exchangeable lens comprises an optical characteristics storage unit where optical characteristics information pertaining to optical characteristics of the exchangeable lens including, at least, information pertaining to peripheral shading characteristics of the exchangeable lens, is stored, an optical characteristics information generation unit that generates information pertaining to optical characteristics of the exchangeable lens to be transmitted to the camera body based upon the optical characteristics information stored in the optical characteristics storage unit, and an optical characteristics transmission unit that transmits information pertaining to the optical characteristics of the exchangeable lens having been generated by the optical characteristics information generation unit to the camera body, peripheral shading information for only some image heights is stored as the information pertaining to the peripheral shading characteristics of the exchangeable lens into the optical characteristics storage unit, but peripheral shading information for at least one image height position among (N−1) image height positions equal to integral multiples of y1, which represents an image height equal to 1/N of an image height measured from the center of a substantially rectangular image capturing range to one of the four corners of the image capturing range, obtained by multiplying y1 by integers in a range of 2 through N, is not stored in the optical characteristics storage unit, the optical characteristics information generation unit generates the peripheral shading information for the (N−1) image height positions to be transmitted to the camera body based upon the information pertaining to the peripheral shading characteristics of the exchangeable lens stored in the optical characteristics storage unit, the optical characteristics transmission unit transmits the peripheral shading information for the (N−1) image height positions generated by the optical characteristics information generation unit, the camera body comprises an exposure calculation means for executing exposure calculation so as to achieve optimal exposure in correspondence to the subject brightness, an image processing unit that executes the image processing for image data obtained through image capturing operation and an optical characteristics information reception unit that receives, at least, peripheral shading information for the (N−1) image height positions among various types of information indicating the optical characteristics of the exchangeable lens, from the optical characteristics transmission unit, the exposure calculation unit executes exposure calculation so as to achieve the optimal exposure corresponding to the subject brightness by referencing the peripheral shading information for image height positions measured from the center of the image capturing range equivalent to even-number multiples of y1 obtained by multiplying y1 by even numbers in a range of 2 through N among sets of peripheral shading information corresponding to the (N−1) image height positions received at the optical characteristics information reception unit, and the image processing unit executes the image processing on the image data by referencing the peripheral shading information for the (N−1) image height positions received at the optical characteristics information reception unit.

Second Embodiment

In reference to FIGS. 10 through 14, the exchangeable lens and the camera system achieved in the second embodiment of the present invention are described. The camera system achieved in the second embodiment is basically similar in structure to the camera system in the first embodiment. The following description will focus on features differentiating the second embodiment from the first embodiment.

In the second embodiment, peripheral shading information is generated by using a predetermined calculation expression instead of by referencing peripheral shading information tables. Accordingly, a specific control program to be executed by the lens-side control unit 203, position information tables such as those shown in FIGS. 5A and 5B, a peripheral shading calculation expression to be described in detail later, and the like are stored in advance into the ROM 215 at the lens barrel 200. The following is a detailed description of the calculation executed to generate peripheral shading information.

(Optical Characteristics of the Image Forming Optical System 210)

Depending upon its optical characteristics, the image forming optical system 210 may manifest different degrees of transmittance in correspondence to, for instance, varying wavelengths of subject light, or it may manifest distortion, peripheral shading, magnification factor chromatic aberration or the like. Furthermore, the optical characteristics of the image forming optical system 210 are bound to vary depending upon the model and the type of lens barrel 200. Accordingly, information related to the optical characteristics of the image forming optical system 210 is transmitted from the lens barrel 200 to the camera body 100 in the embodiment. Then, various types of correction processing are executed at the camera body 100 based upon the information thus received. The whole process will be described in specific detail below.

Information pertaining to the optical characteristics of the image forming optical system 210 is stored in advance in the ROM 215. The following description is given in reference to information related to the peripheral shading characteristics and the magnification factor chromatic aberration characteristics among various types of information pertaining to the optical characteristics of the image forming optical system 210 that may be stored into the ROM 215.

Information Pertaining to the Peripheral Shading Characteristics

Figure 10:
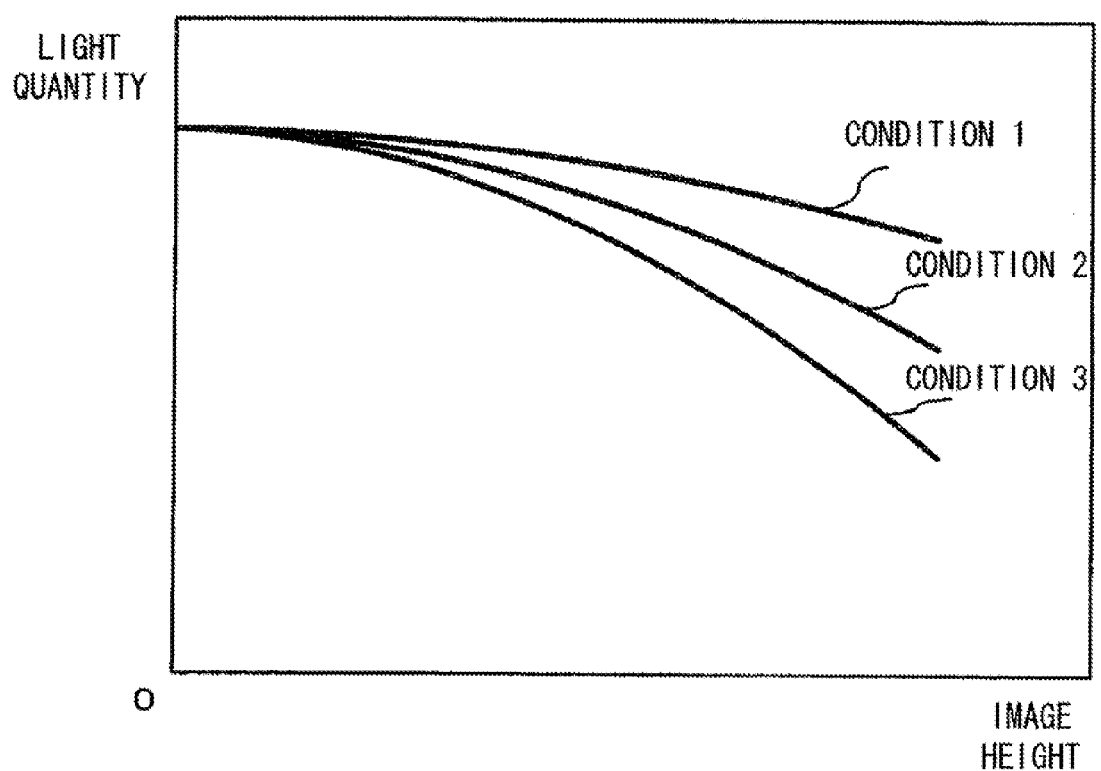
FIG. 10 presents an example of a graph of peripheral light quantity approximate expressions that may be used in a second embodiment of the present invention.

An approximating expression (calculation expression) to be used to calculate degrees of peripheral shading (peripheral shading values) in correspondence to image height set as a parameter, is stored in the ROM 215 as peripheral shading information in the embodiment. FIG. 10 presents graphs of the approximating expression that may be used to calculate peripheral light quantities. In FIG. 10, the image height is indicated along the horizontal axis and the light quantity is indicated along the vertical axis. The approximating expression can be written as, for instance, a quadratic equation as in (1) below.

$$\text{Light quantity} = Ax^2 + Bx + C \quad (1)$$

In the expression above, x represents the image height, whereas A, B and C are coefficients to be described later.

The extent to which the light quantity becomes lower (the degree of peripheral shading) in correspondence to the image height, is affected by the aperture value, the focal length and the focus position (photographic distance) as well as by the image height. For instance, under "condition 1", in which the aperture value, the focal length and the photographic distance assume a given set of values, the relationship between image height and the light quantity is represented by the curve marked "condition 1" in FIG. 10 with specific values taken for the individual coefficients A, B and C in expression (1). In addition, under a condition (e.g., "condition 2" or "condition 3") different from "condition 1", the relationship between the image height and the light quantity is represented by the curve marked "condition 2" or "condition 3" in FIG. 10, with at least some of the coefficients A, B and C in expression (1) taking values different from those taken in "condition 1".

Figure 11:
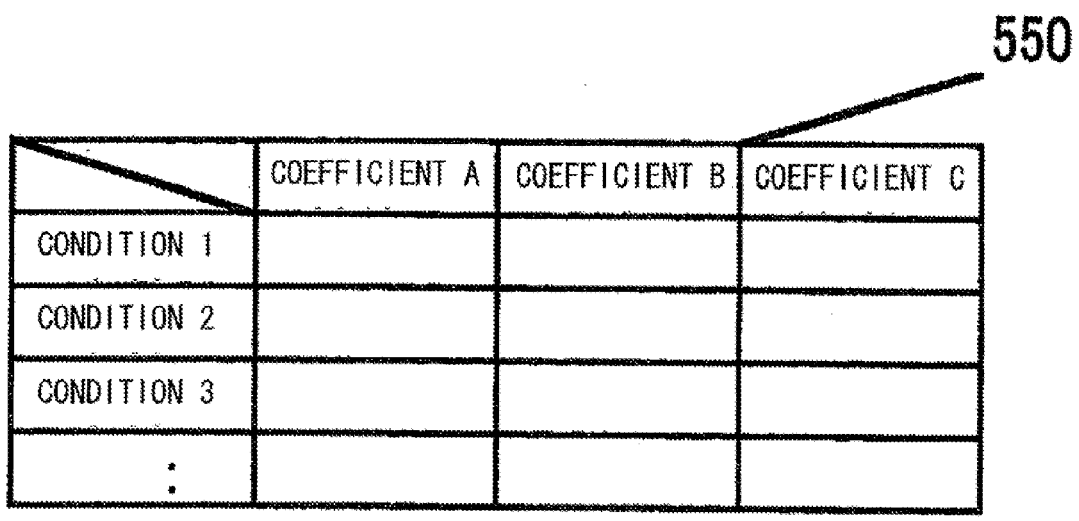
FIG. 11 shows information pertaining to the coefficients in the peripheral light quantity approximate expressions, stored in the ROM in the exchangeable lens.

Accordingly, a coefficient table 550 such as that shown in FIG. 11 indicating values taken for the coefficients A, B and C under various conditions in correspondence to different values assumed for the aperture value, the focal length and the photographic distance, is stored in advance into the ROM 215 in the embodiment. It is to be noted that while each field in the coefficient table 550 is left blank in FIG. 11 so as not to crowd the illustration, a specific value to be taken for the coefficient A, B or C in correspondence to the condition determined by the set of values indicating the current aperture value, focal length and photographic distance, is entered in each field in the actual coefficient table 550.

Figure 12:
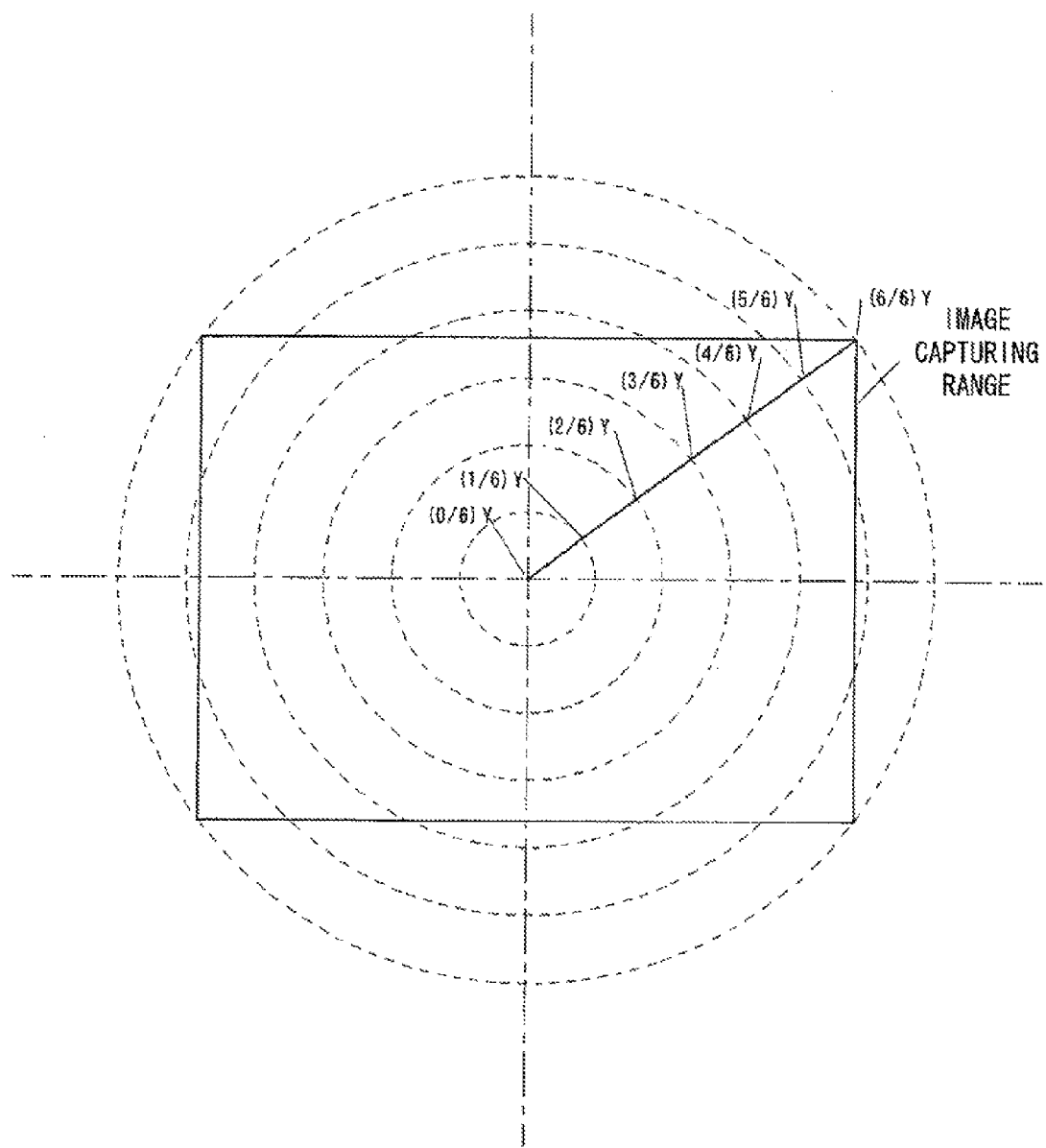
FIG. 12 illustrates the image height relative to peripheral shading characteristics information stored in the ROM in the exchangeable lens.

As will be described in further detail later, the lens-side control unit 203 reads out the values to be taken for the individual coefficients A, B and C in correspondence to the condition determined by the values indicating the current aperture value, focal length and photographic distance, from the coefficient table 550 and obtains, through calculation executed as expressed in (1), the peripheral shading information for five different image heights $(2/6)Y$ through $(6/6)Y$ over $(1/6)Y$ pitches. Y represents the image height ranging from the center of a substantially rectangular image capturing range (the optical axis of the subject light flux) to one of the four corners of the image capturing range, as shown in FIG. 12. The lens-side control unit 203 then controls the various units so as to transmit the peripheral shading information for the five different image heights, having been generated through calculation as described above, from the lens barrel 200 to the camera body 100.

In the embodiment, peripheral shading information to be transmitted from the lens barrel 200 to the camera body 100, is generated through calculation for five image height positions $(2/6)Y$ through $(6/6)Y$ over $(1/6)Y$ pitches for the following reasons.

(1) As a request signal asking for a signal carrying information pertaining to the peripheral shading characteristics is received, the lens-side control unit 203 controls the various units so as to transmit the peripheral shading information for the five image heights, corresponding to the current values assumed for the aperture value, the focal length and the photographic distance, to the camera body 100, as will be described in detail later. While the accuracy of peripheral shading correction processing executed at the camera body 100, as will be described later, can be improved providing the camera body 100 with peripheral shading information corresponding to image height positions, the arithmetic operation load on the lens-side control unit 203 and the load of data communication with the camera body 100 are bound to be greater.

(2) If, on the other hand, peripheral shading information corresponding to four or fewer image heights is transmitted to the camera body 100, the arithmetic operation load on the lens-side control unit 203 and the load of communication carried out with the camera body 100 will be lightened. However, it would be difficult to assure improved accuracy in the peripheral shading correction processing (in particular, correction processing executed for the captured image) executed at the camera body 100 in conjunction with fewer sets of peripheral shading information.

(3) In conjunction with the peripheral shading information transmitted with uniform image height pitches of $(1/6)Y$ pitches, the arithmetic operation to be executed at the body-side control unit 103 to obtain, through linear interpolation, a gain value to be used in peripheral shading correction for a given image height in the range of 0 through Y, as will be described later, can be simplified.

(4) Since peripheral shading does not occur readily near the center of the image capturing range, there is not much point in generating through calculation peripheral shading information for an image height near the image capturing range center at the lens barrel 200, particularly since it would increase the load of data communication with the camera body 100 to transmit the peripheral shading information thus generated. For this reason, the arithmetic operation executed at the lens barrel 200 to generate the peripheral shading information for the image height $(0/6)Y$ and the transmission of the peripheral shading information for the image height $(1/6)Y$ can be omitted while peripheral shading information for transmission is provided over constant image height pitches of $(1/6)Y$ pitches.

(5) As will be explained later, as long as the peripheral shading values for three image heights; the image height $(1/3)Y$, i.e., $(2/6)Y$, the image height $(2/3)Y$, i.e., $(4/6)Y$ and the image height $(3/3)Y$, i.e., $(6/6)Y$ are available for the exposure calculation executed during a photographing operation, correction processing can be executed so as to obtain the optimal exposure value. However, if the volume of peripheral shading information transmitted to the camera body 100 is decreased, it will be difficult to improve the accuracy of the peripheral shading correction processing executed at the camera body 100 for a captured image. For this reason, peripheral shading information for the halfway position (i.e., $(3/6)Y$) between the image height $(1/3)Y$ and the image height $(2/3)Y$ and for the halfway position (i.e., $(5/6)Y$) between the image height $(2/3)Y$ and the image height $(3/3)Y$, generated through calculation, is also transmitted.

Information Pertaining to Magnification Factor Chromatic Aberration

Figure 14:
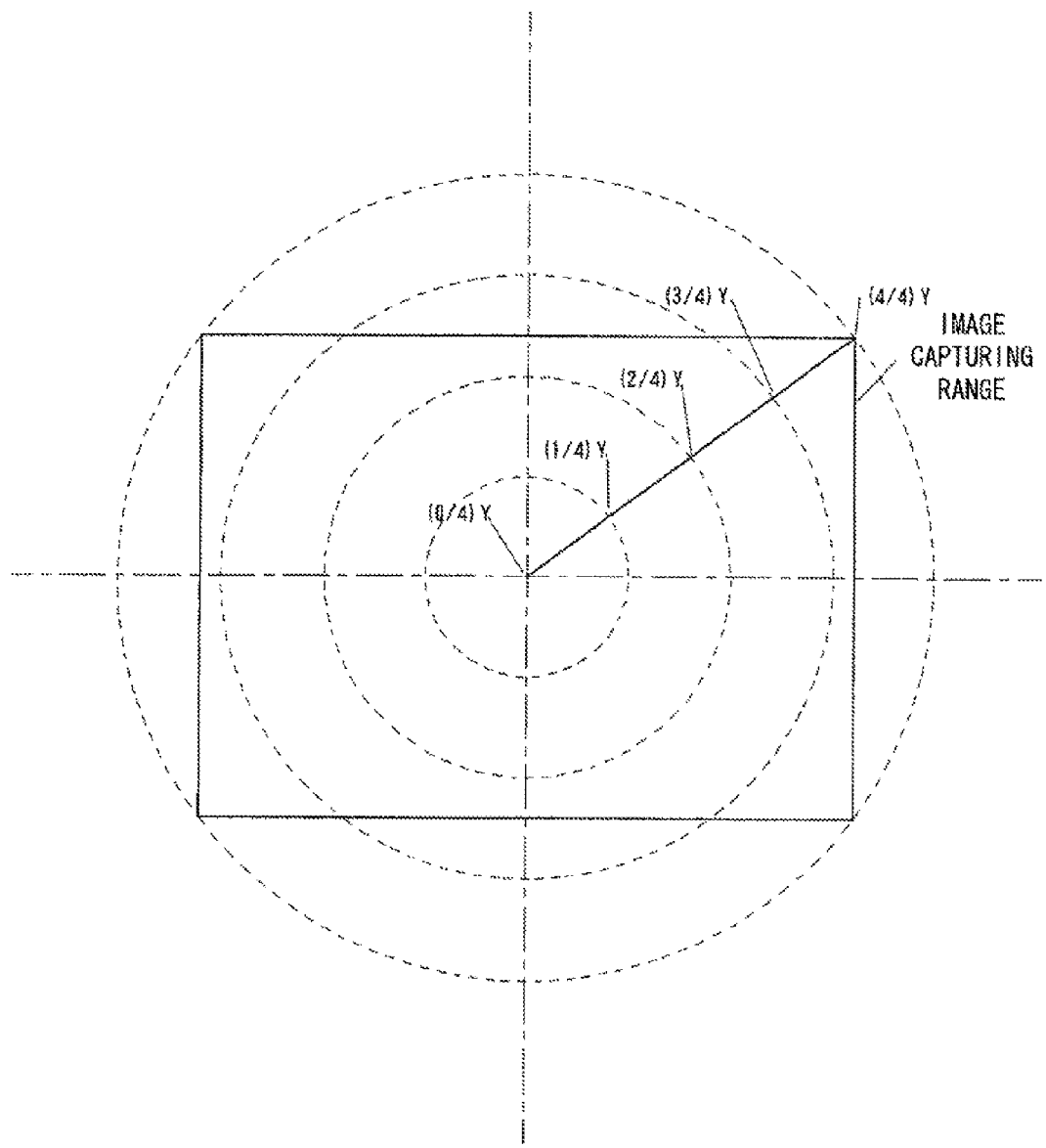
FIG. 14 illustrates the image height relative to magnification factor chromatic aberration information stored in the ROM in the exchangeable lens.

FIG. 13 presents an example of a magnification factor chromatic aberration information, table holding information pertaining to the magnification factor chromatic aberration, stored in the ROM 215. A magnification factor chromatic aberration information table 540 shown in FIG. 13 indicates varying degrees of magnification factor chromatic aberration to manifest with red light at an image height $(2/4)Y$ measured from the center of a substantially rectangular image capturing range with Y representing the image height ranging from the center of the image capturing range (from the optical axis of the subject light flux) to one of the four corners of the image capturing range measured as shown in FIG. 14.

The degree of magnification factor chromatic aberration, which is affected by the wavelength of light and the image height, is also bound to vary depending upon the focal length or the photographic distance. Accordingly, magnification factor chromatic aberration information corresponding to a given color (wavelength) and a given image height, such as that held in the magnification factor chromatic aberration information table 540 shown in FIG. 13, is stored in the ROM 215 as data in a matrix format with the focal length and the photographic distance taken as parameters. It is to be noted that while the field in each square in the magnification factor chromatic aberration information table 540 in FIG. 13 is left blank so as not to crowd the illustration, a value indicating the degree of aberration with reference to green light aberration is entered in each field in the actual magnification factor chromatic aberration information table 540.

In the ROM 215, magnification factor chromatic aberration information tables 540 for three different image heights $(2/4)Y$, $(3/4)Y$ and $(4/4)Y$ are stored in correspondence to red light and blue light.

(Transmission of Information Pertaining to the Optical Characteristics of the Image Forming Optical System 210)

As explained earlier, upon receiving, via the second transmission path 320, a request signal calling for a signal carrying information pertaining to the optical characteristics of the image forming optical system 210, the lens-side control unit 203 collects the requested information pertaining to the optical characteristics of the image forming optical system 210 from various units or generates through calculation the request information pertaining to the optical characteristics of the image forming optical system 210. The lens-side control unit 203 then transmits the collected or generated information to the camera body 100 through the second transmission path 320. The lens-side control unit 203 generates through calculation information pertaining to the peripheral shading characteristics and transmits the peripheral shading information to the camera body 100 through the second transmission path 320 as described below.

Upon receiving a request signal calling for a signal carrying the peripheral shading information through the second transmission path 320, the lens-side control unit 203 calculates the current photographic distance and the current focal length of the image capturing optical system 210 based upon the lens position signal and the focal length signal respectively output from the lens position detection unit 213 and the focal length detection unit 214. In addition, upon receiving, via the second transmission path 320, a request signal calling for a signal carrying information pertaining to the peripheral shading characteristics, the lens-side control unit 203 calculates the current aperture value at the iris aperture (not shown) based upon a signal indicating the aperture value currently set for the iris aperture, which is output from an aperture value detection unit (not shown).

The lens-side control unit 203 then reads out the individual coefficients A, B and C corresponding to the condition determined by the current values taken for the aperture value, the focal length and the photographic distance, from the coefficient table 550 and obtains, through calculation executed as expressed in (1), peripheral shading information for the five image heights (2/6)Y through (6/6)Y over (1/6)Y pitches.

Subsequently, the lens-side control unit 206 controls the lens-side transmission/reception unit 217 so as to transmit the peripheral shading values having been obtained through the second transmission path 320. As a result, the information pertaining to the peripheral shading characteristics is transmitted to the camera body 100.

For instance, the values calculated as the current aperture value, photographic distance and focal length may be F 4.5, L4 and f7 respectively. In such a case, the lens-side control unit 203 reads out the individual coefficients A, B and C, corresponding to the condition determined by these values, from the coefficient table 550. Then, the lens-side control unit 203 calculates the light quantity at the image height (2/6)Y measured from the image capturing range center by substituting the values having been read out from the coefficient table 550 for the coefficients A, B and C in expression (1). The lens-side control unit 203 also calculates the light quantities at the other image heights (3/6)Y through (6/6)Y measured from the image capturing range center as expressed in (1).

Subsequently, the lens-side control unit 203 controls the lens-side transmission/reception unit 217 so as to transmit, via the second transmission path 320, the peripheral shading values having been obtained in correspondence to the five different image heights (2/6)Y, (3/6)Y, (4/6)Y, (5/6)Y and (6/6)Y.

It is to be noted that the magnification factor chromatic aberration information is transmitted as described below. Upon receiving a request signal asking for a signal carrying magnification factor chromatic aberration information through the second transmission path 320, the lens-side control unit 203 calculates the current photographic distance and the current focal length of the image forming optical system 210 as explained earlier.

The lens-side control unit 203 then obtains the individual magnification factor chromatic aberration values corresponding to the current photographic distance and focal length having been calculated by reading the values from a total of six magnification factor chromatic aberration information tables 540 provided in correspondence to three different image heights (2/4)Y, (3/4)Y and (4/4)Y and in correspondence to red light and blue light. It is to be noted that if the current photographic distance or focal length having been calculated does not match any of the photographic distances or focal lengths discretely set in the magnification factor chromatic aberration information tables 540, the lens-side control unit 203 will obtain the magnification factor chromatic aberration values at the current photographic distance and focal length through linear interpolation (or another type of interpolation) executed as required by referencing the magnification factor chromatic aberration information tables 540.

Subsequently, the lens-side control unit 203 controls the lens-side transmission/reception unit 217 so as to transmit the magnification factor chromatic aberration values having been obtained as described above via the second transmission path 320. The magnification factor chromatic aberration information is thus transmitted to the camera body 100.

(Correction Processing Executed Based upon the Information Pertaining to the Optical Characteristics of the Image Forming Optical System 210)

As the peripheral shading values corresponding to the five different image heights (2/6)Y, (3/6)Y, (4/6)Y, (5/6)Y and (6/6)Y obtained as described above are received at the body-side transmission/reception unit 117 via the second transmission path 320, the body-side control unit 103 stores the received peripheral shading values into the RAM 119. It is to be noted that each time the peripheral shading values, which are cyclically transmitted from the lens barrel 200 over regular intervals, are received on the body side, the body-side control unit 103 writes the latest peripheral shading values over the previous values stored in the RAM 119 for an update. The magnification factor chromatic aberration information is updated in a similar manner.

The body-side control unit 103 executes correction processing so as to obtain the optimal exposure value in the exposure calculation during a photographing operation by referencing the peripheral shading values for three image heights (2/6)Y, (4/6)Y and (6/6)Y among the peripheral shading values stored in the RAM 119. In other words, the body-side control unit 103, executing the exposure calculation during a photographing operation based upon pixel output data provided from the image capturing pixels at the image sensor 104, calculates the exposure value by referencing the peripheral shading values corresponding to the three image heights as described above. Namely, the body-side control unit 103 executes the exposure calculation so as to achieve the optimal exposure corresponding to the brightness of the subject by referencing the peripheral shading information for image height positions measured from the image capturing range center, which are equivalent to even-number multiples of (1/6)Y, i.e., twice (1/6)Y, four times (1/6)Y and six times (1/6)Y.

In addition, the body-side control unit 103 executes correction processing for the image obtained through image capturing operation by referencing the peripheral shading values corresponding to the five different image heights (2/6)Y through (6/6)Y stored in the RAM 119. In other words, following the image capturing operation, the body-side control unit 103 executes the image processing so as to minimize the adverse effect of peripheral shading on the captured image by referencing the peripheral shading values corresponding to the five image heights. In more specific terms, the body-side control unit 103 calculates gain values to be used to correct peripheral shading at the various image heights by referencing the peripheral shading values for the five image heights (2/6)Y through (6/6)Y stored in the RAM 119. The body-side control unit 103 then executes the image processing for minimizing the adverse effect of peripheral shading on the captured image by referencing the gain values having been calculated. It is to be noted that the peripheral shading values stored in the RAM 119 are discrete values corresponding to the five image heights and, accordingly, the body-side control unit 103 calculates a gain value to be used for purposes of peripheral shading correction at a given image height in the 0 through Y range by executing linear interpolation as necessary.

The body-side control unit 103 executes correction for the captured image by referencing magnification factor chromatic aberration information corresponding to the three image heights (2/4)Y, (3/4)Y and (4/4)Y stored in the RAM 119. In other words, following the image-capturing operation, the body-side control unit 103 executes the image processing for minimizing the adverse effect of magnification factor chromatic aberration on the captured image by referencing the magnification factor chromatic aberration information for the three image heights obtained as described earlier.

The following operational effects are achieved with the camera system in the second embodiment.

(1) The lens barrel 200 (exchangeable lens) is equipped with a ROM 215 functioning as an optical characteristics storage unit where information pertaining to the optical characteristics of the exchangeable lens 200, including at least information pertaining to the peripheral shading characteristics of the exchangeable lens 200, is stored, a lens-side control unit 203 functioning as an optical characteristics information generation unit that generates information pertaining to optical characteristics of the exchangeable lens 200, to be transmitted to the camera body 100, based upon the optical information stored in the optical characteristics storage unit, and a lens-side transmission/reception unit 217 functioning as an optical characteristics transmission unit that transmits the information pertaining to the optical characteristics of the exchangeable lens 200, having been generated by the optical characteristics information generation unit, to the camera body 100. In the optical characteristics storage unit, a calculation expression to be used to generate through calculation peripheral shading information by using image height as a parameter, is stored as peripheral shading information pertaining to the peripheral shading characteristics of the exchangeable lens 200. The optical characteristics information generation unit generates peripheral shading information for five image height positions, measured from the center of a substantially rectangular image capturing range, equivalent to integral multiples of y1, which represents the image height equal to 1/6 of the image height ranging from the center of the image capturing range to one of the four corners of the image capturing range, by integers in a range 2 through 6, based upon the calculation expression stored in the optical characteristics storage unit. The optical characteristics transmission unit, in turn, transmits the peripheral shading information for the five image height positions, generated by the optical characteristics information generation unit, to the camera body 100. In more specific terms, a calculation expression to be used to calculate the degree of peripheral shading by using image height as a parameter, is stored in the ROM 215 as the peripheral shading information, and peripheral shading information for five different image heights (2/6)Y, (3/6)Y, (4/6)Y, (5/6)Y and (6/6)Y is generated through calculation by using the calculation expression. Then, the peripheral shading information for the five image heights, having been generated by using the calculation expression, is transmitted to the camera body 100. Through these measures, enough information to assure the required level of accuracy for the peripheral shading correction processing executed at the camera body 100 can be provided while keeping down the memory capacity required in the ROM 215.

(2) The peripheral shading information generated through calculation executed at the lens barrel 200 and transmitted to the camera body 100 is provided with uniform image height pitches of (1/6)Y pitches. Thus, the arithmetic operation load on the body-side control unit 103 executing linear interpolation to determine the gain to be used in peripheral shading correction for a given image height in the range of 0 through Y can be reduced, as explained earlier.

(3) The peripheral shading values for the five different image heights, corresponding to the current aperture value, photographic distance and focal length, alone are transmitted to the camera body 100. This means that since the peripheral shading information needed at the camera body 100 alone can be transmitted, the volume of data for transmission can be kept down. As a result, the communication load can be reduced and the various operations can be executed at the camera body 100 with better response.

(4) The lens position detection unit 213 detects the position of the focusing lens 210*d* and outputs a lens position signal. The lens-side transmission/reception unit 217 cyclically transmits the lens position signal, output from the lens position detection unit 213, to the camera body 100 through the first transmission path 310. The information indicating the macro focus match position, the macro limit position and the infinity limit position and the information pertaining to the optical characteristics of the image forming optical system 210, on the other hand, are transmitted to the camera body 100 via the second transmission path 320 which is different from the first transmission path 310. Through these measures, it is ensured that the transmission of information pertaining to the optical characteristics of the image capturing optical system 210 and the like does not interfere with the transmission of the lens position signal.

(5) The body-side control unit 103 requests that the lens position signal be transmitted by shifting the signal level at a specific signal line instead of by transmitting data expressing a lens position signal transmission request to the lens-side control unit 203. Thus, the request for lens position signal transmission can be issued without necessitating any additional data communication.

(6) The body-side control unit 103 executes correction processing for obtaining the optimal exposure value in the exposure calculation during a photographing operation by referencing the peripheral shading values corresponding to three different image heights (2/6)Y, (4/6)Y and (6/6)Y among the peripheral shading values stored in the RAM 119. In addition, the body-side control unit 103 executes the peripheral shading correction processing for a captured image by referencing the peripheral shading values for the five different image heights (2/6)Y through (6/6)Y stored in the RAM 119. Since the common peripheral shading values can be used for the exposure calculation and the image processing, the volume of data that need to be received from the lens barrel 200 can be reduced, which, in turn, leads to a reduction in the communication load and the load on the body-side control unit 103 executing the exposure calculation and the image processing. Furthermore, since comprehensive peripheral shading correction processing is enabled through the exposure calculation and the image processing, the quality of images obtained through image-capturing operations can be improved.

(7) The lens-side transmission/reception unit 217 cyclically transmits the lens position signal with a frequency higher than the transmission frequency at which the information indicating the macro focus match position and the like is transmitted. Consequently, automatic focus adjustment can be executed with improved response.

Variations of the Second Embodiment (1) In the embodiment described above, expression (1), which is an approximating expression used when calculating the degree of peripheral shading by using the image height as a parameter, is a quadratic expression. However, the present invention is not limited to this example. In other words, the degree of peripheral shading may be calculated by using the image height as a parameter through an approximating expression that is a higher order polynomial approximating expression, e.g., a cubic expression, instead of a quadratic expression. In addition, the degree of peripheral shading may be calculated by using the image height as a parameter through a cyclical function-based approximating expression.

(2) In the embodiment described above, a coefficient table 550 such as that shown in FIG. 11, listing values taken for the coefficients A, B and C under various conditions each corresponding to a given set of values assumed for the aperture value, the focal length and the photographic distance, is stored in advance into the ROM 215. The values for the individual coefficients A, B and C, corresponding to a specific condition determined by the current values of the aperture value, the focal length and the photographic distance, are read from the coefficient table 550 and the peripheral shading information for the five different image heights $(2/6)Y$ through $(6/6)Y$ is calculated over $(1/6)Y$ pitches, as expressed in (1) by using the image height as a parameter. However, the present invention is not limited to this example. For instance, an approximating expression to be used when calculating the degree of peripheral shading by using the aperture value, the focal length and the photographic distance, as well as the image height as parameters may be stored in the ROM 215 and the degree of peripheral shading may be calculated by using the current values for the image height, the aperture value, the focal length and the photographic distance for substitution in the approximating expression.

(3) While peripheral shading information for five different image heights $(2/6)Y$ through $(6/6)Y$ is calculated over $(1/6)Y$ pitches by using the image height as a parameter in the embodiment described above, the present invention is not limited to these particulars. Namely, the peripheral shading information according to the present invention should be generated through calculation by using the image height as a parameter for (N−1) image heights $(2/N)Y$ through $(N/N)Y$ over $(1/N)Y$ pitches with N representing an integer equal to or greater than 2.

(4) The embodiment described above may be adopted in a video shooting operation as well as in a still image shooting operation.

(5) The embodiment and the variations thereof described above may be adopted in any conceivable combination.

It is to be noted that the present invention is not limited in any way whatsoever to the particulars of the embodiment described above, and it may be adopted in conjunction with an exchangeable lens having any of various structures that can be detachably mounted at a camera body, comprising an optical characteristics storage unit where optical characteristics information pertaining to optical characteristics of the exchangeable lens including, at least, information pertaining to peripheral shading characteristics of the exchangeable lens, is stored, an optical characteristics information generation unit that generates information pertaining to optical characteristics of the exchangeable lens to be transmitted to the camera body based upon the optical characteristics information stored in the optical characteristics storage unit, and an optical characteristics transmission unit that transmits information pertaining to the optical characteristics of the exchangeable lens, having been generated by the optical characteristics information generation unit, to the camera body, and is characterized in that a calculation expression to be used to generate through calculation peripheral shading information by using an image height as a parameter, is stored in the optical characteristics storage unit as the information pertaining to the peripheral shading characteristics of the exchangeable lens, that the optical characteristics information generation unit generates, based upon the calculation expression stored in the optical characteristics storage unit, peripheral shading information for five image height positions measured from a center of a substantially rectangular image capturing range, equivalent to integral multiples of y1, which represents an image height equal to ⅙ of an image height ranging from the center of the image capturing range to one of the four corners of the image capturing range, by integers in a range of 2 through 6, and that the optical characteristics transmission unit transmits the peripheral shading information for the five image height positions generated by the optical characteristics information generation unit.

Furthermore, the present invention is not limited in any way whatsoever to the particulars of the embodiment described above and may be adopted in a camera system having any of various structures, as long as the camera system includes a camera body and an exchangeable lens detachably mounted at the camera body, the exchangeable lens comprises an optical characteristics storage unit where optical characteristics information pertaining to optical characteristics of the exchangeable lens including, at least, information pertaining to peripheral shading characteristics of the exchangeable lens, is stored, an optical characteristics information generation unit that generates information pertaining to optical characteristics of the exchangeable lens to be transmitted to the camera body based upon the optical characteristics information stored in the optical characteristics storage unit, and an optical characteristics transmission unit that transmits the information pertaining to the optical characteristics of the exchangeable lens, having been generated by the optical characteristics information generation unit, to the camera body, a calculation expression to be used to generate through calculation peripheral shading information by using an image height as a parameter, is stored in the optical characteristics storage unit as the information pertaining to the peripheral shading characteristics of the exchangeable lens, the optical characteristics information generation unit generates, based upon the calculation expression stored in the optical characteristics storage unit, peripheral shading information for five image height positions, measured from a center of a substantially rectangular image capturing range, equivalent to integral multiples of y1, which represents an image height equal to ⅙ of an image height ranging from the center of the image capturing range to one of the four corners of the image capturing range, obtained by multiplying y1 by integers in a range 2 through 6, the optical characteristics transmission unit, transmits the peripheral shading information for the five image height positions generated by the optical characteristics information generation unit, the camera body comprises an exposure calculation unit that executes exposure calculation so as to achieve optimal exposure in correspondence to the subject brightness, an image processing unit that executes the image processing for image data obtained through image capturing operation and an optical characteristics information reception unit that receives, at least, peripheral shading information for the five image height positions among various types of information pertaining to the optical characteristics of the exchangeable lens, from the optical characteristics transmission unit, the exposure calculation unit executes the exposure calculation so as to achieve the optimal exposure corresponding to the subject brightness by referencing peripheral shading information for image height positions measured from the center of the image capturing range equivalent to even-number multiples of y1 obtained by multiplying y1 by 2, 4 and 6, among sets of peripheral shading information corresponding to the five image height positions received at the optical characteristics information reception unit, and the image processing unit executes the image processing on the image data by referencing the peripheral shading information for the five image height positions received at the optical characteristics information reception unit.

In addition, the present invention is not limited in any way whatsoever to the particulars of the embodiment described above, and it may be adopted in conjunction with an exchangeable lens having any of various structures that can be detachably mounted at a camera body, as long as it comprises an optical characteristics storage unit where optical characteristics information pertaining to the optical characteristics of the exchangeable lens including, at least, information pertaining to peripheral shading characteristics of the exchangeable lens, is stored, an optical characteristics information generation unit that generates information pertaining to optical characteristics of the exchangeable lens to be transmitted to the camera body based upon the optical characteristics information stored in the optical characteristics storage unit, and an optical characteristics transmission unit that transmits the information pertaining to the optical characteristics of the exchangeable lens, having been generated by the optical characteristics information generation unit, to the camera body, and is characterized in that a calculation expression to be used to generate through calculation peripheral shading information by using an image height as a parameter, is stored in the optical characteristics storage unit as the information pertaining to the peripheral shading characteristics of the exchangeable lens, that the optical characteristics information generation unit generates, based upon the calculation expression stored in the optical characteristics storage unit, peripheral shading information for (N−1) image height positions (N represents any integer equal to or greater than 2) measured from a center of a substantially rectangular image capturing range, equivalent to integral multiples of y1, which represents an image height equal to 1/N of an image height ranging from the center of the image capturing range to one of the four corners of the image capturing range, obtained by multiplying y1 by integers in a range of 2 through N, and that the optical characteristics transmission unit transmits the peripheral shading information for the (N−1) image height positions generated by the optical characteristics information generation unit.

Moreover, the present invention is not limited in any way whatsoever to the particulars of the embodiment described above and may be adopted in a camera system having any of various structures, as long as the camera system includes a camera body and an exchangeable lens detachably mounted at the camera body, the exchangeable lens comprises an optical characteristics storage unit where optical characteristics information pertaining to optical characteristics of the exchangeable lens including, at least, information pertaining to peripheral shading characteristics of the exchangeable lens, is stored, an optical characteristics information generation unit that generates information pertaining to optical characteristics of the exchangeable lens to be transmitted to the camera body based upon the optical characteristics information stored in the optical characteristics storage unit, and an optical characteristics transmission unit that transmits the information pertaining to the optical characteristics of the exchangeable lens, having been generated by the optical characteristics information generation unit, to the camera body, a calculation expression to be used to generate through calculation peripheral shading information by using an image height as a parameter, is stored in the optical characteristics storage unit as the information pertaining to the peripheral shading characteristics of the exchangeable lens, the optical characteristics information generation unit generates, based upon the calculation expression stored in the optical characteristics storage unit, peripheral shading information for (N−1) image height positions (N is an integer equal to or greater than 2) measured from a center of a substantially rectangular image capturing range, equivalent to integral multiples of y1, which represents an image height equal to 1/N of the image height ranging from the center of the image capturing range to one of the four corners of the image capturing range, obtained by multiplying y1 by integers in a range of 2 through N, the optical characteristics transmission unit transmits the peripheral shading information for the (N−1) image height positions generated by the optical characteristics information generation unit, the camera body comprises an exposure calculation unit that executes exposure calculation so as to achieve optimal exposure in correspondence to the subject brightness, an image processing unit that executes the image processing for image data obtained through image capturing operation and an optical characteristics information reception unit that receives, at least, peripheral shading information for the (N−1) image height positions among various types of information pertaining to the optical characteristics of the exchangeable lens, from the optical characteristics transmission unit, the exposure calculation unit executes the exposure calculation so as to achieve the optimal exposure corresponding to the subject brightness by referencing the peripheral shading information for image height positions measured from the center of the image capturing range equivalent to even-number multiples of y1 obtained by multiplying y1 by even numbers in the range of 2 through N among sets of peripheral shading information corresponding to the (N−1) image height positions received at the optical characteristics information reception unit, and the image processing unit executes the image processing on the image data by referencing the peripheral shading information for the (N−1) image height positions received at the optical characteristics information reception unit.

Through the embodiments described above, comprehensive information sufficient to assure the required level of accuracy in peripheral shading correction processing executed at the camera body can be provided while keeping down the memory capacity required in the optical characteristics storage unit where optical characteristics information is stored.

The above described embodiments are examples, and various modifications can be made without departing from the scope of the invention.

What is claimed is:

1. An exchangeable lens detachably mounted at a camera body, comprising:
an optical characteristics storage unit in which optical characteristics information pertaining to optical characteristics of the exchangeable lens including, at least, information pertaining to peripheral shading characteristics of the exchangeable lens, is stored;
an optical characteristics information generation unit that generates information pertaining to optical characteristics of the exchangeable lens to be transmitted to the camera body based upon the optical characteristics information stored in the optical characteristics storage unit; and
an optical characteristics transmission unit that transmits the information pertaining to the optical characteristics of the exchangeable lens, having been generated by the optical characteristics information generation unit, to the camera body, wherein:
peripheral shading information for only some image heights is stored as the information pertaining to the peripheral shading characteristics of the exchangeable lens into the optical characteristics storage unit, but peripheral shading information for at least one image height position among five image height positions equivalent to integral multiples of y1, which represents an image height equal to ⅙ of an image height measured from a center of a substantially rectangular image capturing range to one of four corners of the image capturing range, obtained by multiplying y1 by integers in a range of 2 through 6, is not stored in the optical characteristics storage unit;
the optical characteristics information generation unit generates the peripheral shading information for the five image height positions to be transmitted to the camera body based upon the information pertaining to the peripheral shading characteristics of the exchangeable lens stored in the optical characteristics storage unit; and
the optical characteristics transmission unit transmits the peripheral shading information for the five image height positions generated by the optical characteristics information generation unit.

2. An exchangeable lens according to claim 1, wherein:
peripheral shading information for image height positions other than the at least one image height position among the five image height positions, is stored in the optical characteristics storage unit as the information pertaining to the peripheral shading characteristics of the exchangeable lens.

3. An exchangeable lens according to claim 1, wherein:
the optical characteristics information generation unit generates the peripheral shading information for the at least one image height position by using peripheral shading information for an image height stored in the optical characteristics storage unit for a substitution.

4. An exchangeable lens according to claim 1, wherein:
the optical characteristics information generation unit generates the peripheral shading information for the at least one image height position through interpolation executed based upon the peripheral shading information for some image heights stored in the optical characteristics storage unit.

5. An exchangeable lens according to claim 1, wherein:
peripheral shading information is stored in the optical characteristics storage unit in correspondence to individual values taken for an aperture value, a focal length and a photographing distance at the exchangeable lens; and
the optical characteristics information generation unit generates the peripheral shading information for the five image height positions in correspondence to an aperture value, a focal length and a photographing distance currently assumed at the exchangeable lens.

6. An exchangeable lens according to claim 5, wherein:
the peripheral shading information is stored discretely in relation to various parameters including the aperture value, the focal length and the photographing distance at the exchangeable lens; and
if the peripheral shading information corresponding to the aperture value, the focal length and the photographing distance currently assumed at the exchangeable lens is not stored in the optical characteristics storage unit, the optical characteristics information generation unit generates the peripheral shading information corresponding to the aperture value, the focal length and the photographic distance currently assumed at the exchangeable lens through interpolation executed based upon the peripheral shading information stored in the optical characteristics storage unit and the aperture value, the focal length and the photographic distance currently assumed at the exchangeable lens.

7. An exchangeable lens according to claim 1, further comprising:
an image forming optical system that includes a focusing lens;
a lens position detection unit that detects a position of the focusing lens and outputs a lens position signal; and
a lens position signal transmission unit that transmits the lens position signal output from the lens position detection unit to the camera body, wherein:
the lens position signal transmission unit transmits the lens position signal output from the lens position detection unit to the camera body via a first transmission path; and
the optical characteristics transmission unit transmits the optical characteristics information to the camera body via a second transmission path different from the first transmission path.

8. An exchangeable lens according to claim 7, further comprising:
a transmission control unit that controls the lens position signal transmission unit and the optical characteristics transmission unit;
a shift detection unit that detects a shift in a signal level at a communication start signal line of the camera body; and
an instruction data reception unit that receives specific data expressing various instructions transmitted from the camera body, wherein:
as the shift detection unit detects a shift in the signal level at the communication start signal line, the transmission control unit controls the lens position signal transmission unit so as to transmit the lens position signal output from the lens position detection unit to the camera body via the first transmission path; and
as the instruction data reception unit receives specific data expressing an instruction for peripheral shading information transmission, the transmission control unit controls the optical characteristics transmission unit so as to transmit the peripheral shading information to the camera body via the second transmission path.

9. An exchangeable lens according to claim 8, wherein:
the instruction data reception unit receives the various instructions over image output cycles with which an image sensor disposed at the camera body outputs images; and the transmission control unit executes control so as to transmit the peripheral shading information to the camera body over cycles corresponding to the image output cycles.

10. A camera system that includes a camera body and an exchangeable lens detachably mounted at the camera body, wherein:

the exchangeable lens comprises:

an optical characteristics storage unit in which optical characteristics information pertaining to optical characteristics of the exchangeable lens including, at least, information pertaining to peripheral shading characteristics of the exchangeable lens, is stored;

an optical characteristics information generation unit that generates information pertaining to optical characteristics of the exchangeable lens to be transmitted to the camera body based upon the optical characteristics information stored in the optical characteristics storage unit; and an optical characteristics transmission unit that transmits the information pertaining to the optical characteristics of the exchangeable lens, having been generated by the optical characteristics information generation unit, to the camera body;

peripheral shading information for only some image heights is stored as the information pertaining to the peripheral shading characteristics of the exchangeable lens into the optical characteristics storage unit, but peripheral shading information for at least one image height position among five image height positions equivalent to integral multiples of y1, which represents an image height equal to ⅙ of an image height measured from a center of a substantially rectangular image capturing range to one of four corners of the image capturing range, obtained by multiplying y1 by integers in a range of 2 through 6, is not stored in the optical characteristics storage unit;

the optical characteristics information generation unit generates the peripheral shading information for the five image height positions to be transmitted to the camera body based upon the information pertaining to the peripheral shading characteristics of the exchangeable lens stored in the optical characteristics storage unit;

the optical characteristics transmission unit transmits the peripheral shading information for the five image height positions generated by the optical characteristics information generation unit;

the camera body comprises:

an exposure calculation unit that executes exposure calculation so as to achieve optimal exposure in correspondence to subject brightness;

an image processing unit that executes image processing for image data obtained through image capturing operation; and an optical characteristics information reception unit that receives, at least, the peripheral shading information for the five image height positions among various types of information pertaining to the optical characteristics of the exchangeable lens, from the optical characteristics transmission unit;

the exposure calculation unit executes the exposure calculation so as to achieve the optimal exposure corresponding to the subject brightness by referencing peripheral shading information for image height positions measured from the center of the image capturing range equivalent to even-number multiples of y1 obtained by multiplying y1 by even numbers in the range 2 through 6 among sets of peripheral shading information corresponding to the five image height positions received at the optical characteristics information reception unit; and the image processing unit executes the image processing on the image data by referencing the peripheral shading information for the five image height positions received at the optical characteristics information reception unit.

11. A camera system according to claim 10, wherein:

the exchangeable lens further comprises:

an image forming optical system that includes a focusing lens;

a lens position detection unit that detects a position of the focusing lens and outputs a lens position signal; and a lens position signal transmission unit that transmits the lens position signal output from the lens position detection unit to the camera body;

the lens position signal transmission unit transmits the lens position signal output from the lens position detection unit to the camera body via a first lens-side transmission path;

the optical characteristics transmission unit transmits the optical characteristics information to the camera body via a second lens-side transmission path different from the first lens-side transmission path;

the camera body further comprises:

a lens position signal reception unit that receives the lens position signal output from the lens position signal transmission unit;

the lens position signal reception unit receives the lens position signal output from the lens position signal transmission unit via a first body-side transmission path; and the optical characteristics information reception unit receives the optical characteristics information via a second body-side transmission path different from the first body-side transmission path.

12. A camera system that includes a camera body and an exchangeable lens detachably mounted at the camera body, wherein:

the exchangeable lens comprises:

an optical characteristics storage unit in which optical characteristics information pertaining to optical characteristics of the exchangeable lens including, at least, information pertaining to peripheral shading characteristics of the exchangeable lens, is stored;

an optical characteristics information generation unit that generates information pertaining to optical characteristics of the exchangeable lens to be transmitted to the camera body based upon the optical characteristics information stored in the optical characteristics storage unit; and an optical characteristics transmission unit that transmits the information pertaining to the optical characteristics of the exchangeable lens having been generated by the optical characteristics information generation unit to the camera body;

peripheral shading information for only some image heights is stored as the information pertaining to the peripheral shading characteristics of the exchangeable lens into the optical characteristics storage unit, but peripheral shading information for at least one image height position among (N−1) image height positions (N is any integer equal to or greater than 3) equivalent to integral multiples of y1, which represents an image height equal to 1/N of an image height measured from a center of a substantially rectangular image capturing range to one of four corners of the image capturing range, obtained by multiplying y1 by integers in a range of 2 through N, is not stored in the optical characteristics storage unit;

the optical characteristics information generation unit generates the peripheral shading information for the (N−1) image height positions to be transmitted to the camera body based upon the information pertaining to the peripheral shading characteristics of the exchangeable lens stored in the optical characteristics storage unit;

the optical characteristics transmission unit transmits the peripheral shading information for the (N−1) image height positions generated by the optical characteristics information generation unit;

the camera body comprises:

an exposure calculation unit that executes exposure calculation so as to achieve optimal exposure in correspondence to subject brightness;

an image processing unit that executes the image processing for image data obtained through image capturing operation; and an optical characteristics information reception unit that receives, at least, the peripheral shading information for the (N−1) image height positions among various types of information indicating the optical characteristics of the exchangeable lens, from the optical characteristics transmission unit;

the exposure calculation unit executes the exposure calculation so as to achieve the optimal exposure corresponding to the subject brightness by referencing peripheral shading information for image height positions measured from the center of the image capturing range equivalent to even-number multiples of y1 obtained by multiplying y1 by even numbers in the range of 2 through N among sets of peripheral shading information corresponding to the (N−1) image height positions received at the optical characteristics information reception unit; and the image processing unit executes the image processing on the image data by referencing the peripheral shading information for the (N−1) image height positions received at the optical characteristics information reception unit.

* * * * *